United States Patent
Ishii et al.

(10) Patent No.: US 11,870,604 B2
(45) Date of Patent: Jan. 9, 2024

(54) COMMUNICATION SYSTEM, COMMUNICATION DEVICE, COMMUNICATION METHOD, TERMINAL, NON-TRANSITORY MEDIUM FOR PROVIDING SECURE COMMUNICATION IN A NETWORK

(71) Applicant: NEC CORPORATION, Tokyo (JP)

(72) Inventors: Satoru Ishii, Tokyo (JP); Hideo Hasegawa, Tokyo (JP); Shintaro Nakano, Tokyo (JP)

(73) Assignee: NEC CORPOATION, Tokyo (JP)

( * ) Notice: Subject to any disclaimer, the term of this patent is extended or adjusted under 35 U.S.C. 154(b) by 0 days.

(21) Appl. No.: 15/745,311

(22) PCT Filed: Jul. 14, 2016

(86) PCT No.: PCT/JP2016/070907
§ 371 (c)(1),
(2) Date: Jan. 16, 2018

(87) PCT Pub. No.: WO2017/014164
PCT Pub. Date: Jan. 26, 2017

(65) Prior Publication Data
US 2019/0013967 A1 Jan. 10, 2019

(30) Foreign Application Priority Data
Jul. 17, 2015 (JP) .................................. 2015-143405

(51) Int. Cl.
| | | |
|---|---|---|
| *H04L 12/46* | (2006.01) | |
| *H04L 12/66* | (2006.01) | |
| *H04L 29/06* | (2006.01) | |
| *H04L 45/64* | (2022.01) | |
| *H04W 12/03* | (2021.01) | |
| *H04L 9/40* | (2022.01) | |
| *H04W 12/00* | (2021.01) | |

(Continued)

(52) U.S. Cl.
CPC ...... *H04L 12/4641* (2013.01); *H04L 12/4633* (2013.01); *H04L 45/64* (2013.01);
(Continued)

(58) Field of Classification Search
CPC . H04L 12/66; H04L 12/4633; H04L 12/4641; H04L 63/164; H04L 63/0227;
(Continued)

(56) References Cited

U.S. PATENT DOCUMENTS 7,673,048 B1 * 3/2010 O'Toole, Jr. ........ H04L 12/4633
709/227
2002/0018456 A1 * 2/2002 Kakemizu ........... H04L 12/4675
370/349

(Continued)

FOREIGN PATENT DOCUMENTS

| | | | |
|---|---|---|---|
| CN | 101582830 A | * | 11/2009 |
| JP | 2004-135248 A | | 4/2004 |

(Continued)

OTHER PUBLICATIONS

Next-generation Wi-Fi Calling Using IMS and 3GPP Wi-Fi Access, Internet search (searched on Apr. 26, 2015) <URL: http: //www.aptilo.com/wi-fi-callin/next-generation-wi-fi-calling-solution>.

(Continued)

*Primary Examiner* — Ruolei Zong
(74) *Attorney, Agent, or Firm* — Sughrue Mion, PLLC

(57) ABSTRACT

A data center comprises a first gateway that connects with a terminal using a VPN (Virtual Private Network) through a wireless LAN and a first wide area network, a second gateway that connects to a second wide area network (WAN2), a virtual network connected to the first gateway and the second gateway; and a function block that is provided between the first gateway and the second gateway and that performs filtering of at least one of a packet input from the first wide area network side and a packet input from the second wide area network.

18 Claims, 11 Drawing Sheets

(51) Int. Cl.
    *H04W 84/12* (2009.01)
    *H04W 12/088* (2021.01)
(52) U.S. Cl.
    CPC ...... *H04L 63/0485* (2013.01); *H04L 63/0876* (2013.01); *H04L 63/0892* (2013.01); *H04W 12/03* (2021.01); *H04L 12/66* (2013.01); *H04L 63/0227* (2013.01); *H04L 63/0245* (2013.01); *H04L 63/164* (2013.01); *H04W 12/009* (2019.01); *H04W 12/088* (2021.01); *H04W 84/12* (2013.01)
(58) Field of Classification Search
    CPC ............. H04L 63/0245; H04L 63/0485; H04L 63/0876; H04L 63/0892; H04L 45/64; H04W 12/001; H04W 12/009; H04W 12/0808; H04W 84/12; H04W 12/03; G06F 9/45558
    USPC ........................................................ 709/238
    See application file for complete search history.

(56) References Cited

U.S. PATENT DOCUMENTS

| | | | |
|---|---|---|---|
| 2004/0037260 A1 | 2/2004 | Mitsuaki et al. | |
| 2006/0039356 A1* | 2/2006 | Rao | H04L 1/1854 370/352 |
| 2007/0237159 A1* | 10/2007 | Yamada | H04L 45/60 370/395.53 |
| 2012/0044949 A1* | 2/2012 | Velev | H04W 8/082 370/401 |
| 2013/0097418 A1* | 4/2013 | Bhatt | H04W 76/12 713/160 |
| 2015/0063166 A1* | 3/2015 | Sif | H04L 41/40 455/418 |
| 2015/0188949 A1* | 7/2015 | Mahaffey | H04L 63/0272 726/1 |

FOREIGN PATENT DOCUMENTS

| | | |
|---|---|---|
| JP | 2006-033443 A | 2/2006 |
| JP | 2010-231396 A | 10/2010 |
| JP | 2014-195167 A | 10/2014 |

OTHER PUBLICATIONS

International Search Report for PCT/JP2016/070907 dated Sep. 27, 2016 [PCT/ISA/210].
Written Opinion for PCT/JP2016/070907 dated Sep. 27, 2016 [PCT/ISA/237].
Communication dated Aug. 28, 2018, from the Japanese Patent Office in counterpart application No. 2017-529865.

* cited by examiner

FIG. 3A

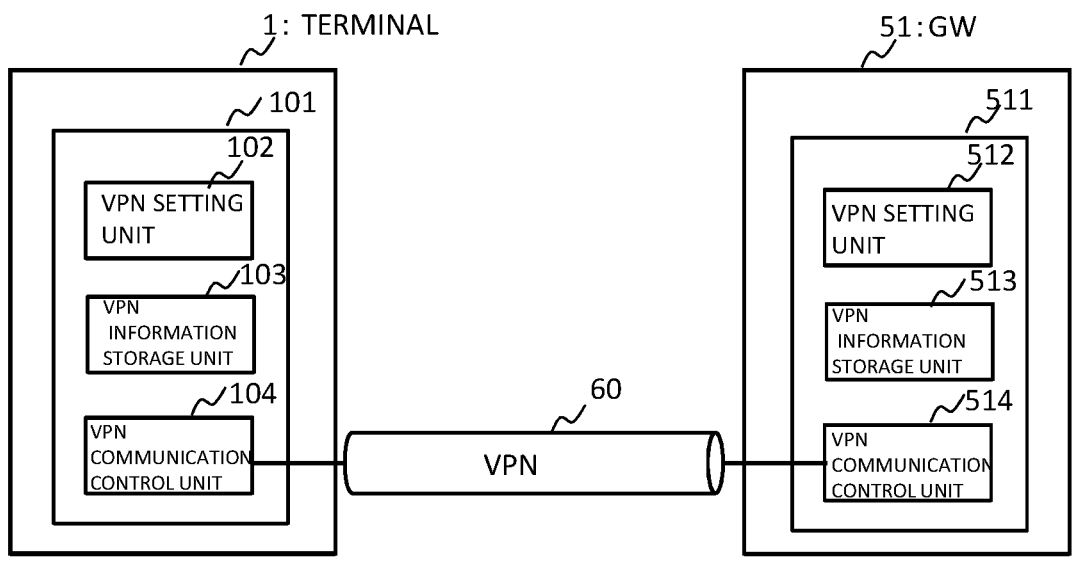

FIG. 3B

| VPN ID | CONNECTION DST ADDRESS | TERMINAL ID/NAME | Pre-shared key | APPARATUS ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.100.1 | smart1 | secret1 | 100.1.1.1 | SHA-1 | AES | 100.1.100.1/32 | PRESENT | |
| VPN2 | 100.1.100.2 | smart2 | secret2 | 100.1.1.1 | SHA-1 | DES | 100.1.100.2/32 | PRESENT | |
| VPN3 | 100.1.100.3 | smart3 | secret3 | 100.1.1.1 | SHA-1 | 3DES | 100.1.100.3/32 | PRESENT | |
| ⋮ | | | | | | | | | |

FIG. 3C

| VPN ID | CONNECTION DST GW ADDRESS | CONNECTION DST GW NAME | Pre-shared key | CLIENT ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.1.1 | example.dc.com | secret1 | 100.1.100.1 | SHA-1 | DES | 100.1.1.0/24 | PRESENT | |

| FILTER ID | TYPE | DIRECTION | PROTOCOL | SOURCE ADDRESS | TRANSMISSION PORT | DESTINATION ADDRESS | DESTINATION PORT |
|---|---|---|---|---|---|---|---|
| 1 | DISCARD | DOWN | TCP/UDP | * | 23 | GW1 | * |
| 2 | DISCARD | DOWN | UDP | xxx.* | * | PRIVATE IP ADDRESS OF TERMINAL1 | * |
| 3 | DISCARD | UP | TCP/UDP | PRIVATE IP ADDRESS OF TERMINAL1 | * | YYY | * |
| ⋮ | | | | | | | |

# COMMUNICATION SYSTEM, COMMUNICATION DEVICE, COMMUNICATION METHOD, TERMINAL, NON-TRANSITORY MEDIUM FOR PROVIDING SECURE COMMUNICATION IN A NETWORK

DESCRIPTION OF RELATED APPLICATION

This application is a National Stage of International Application No. PCT/JP2016/070907 filed Jul. 14, 2016 claims the benefit of Japanese Patent Application No. 2015-143405, filed Jul. 17, 2015, which is hereby incorporated by reference herein in its entirety.

The present invention relates to a communication system, an apparatus, a method, a terminal, and a non-transitory medium.

BACKGROUND

Evolved Packet System (EPS) includes 3GPP (3rd Generation Partnership Project) access network as well as non-3GPP access network. The 3GPP access network includes UTRAN (UMTS (Universal Mobile Telecommunications System) Terrestrial Radio Access Network), E-UTRAN (Evolved UTRAN), GERAN (GSM (Registered Trademark) (Global system for mobile communications) (EDGE Radio Access Network) and so forth.

The Non-3GPP access network is an IP (Internet Protocol) access network using an access technology with specifications outside a scope of 3GPP. The Non-3GPP access network includes a Wi-Fi (Wireless Fidelity) network (registered trademark: Wireless Fidelity) specified by the IEEE (Institute of Electrical and Electronics Engineers, Inc.) 802.11x standard and a wireless LAN (Wireless Local Area Network: WLAN) such as WiMAX (Worldwide Interoperability for Microwave Access) specified by the IEEE 802.16 standard. For non-3GPP access, for example, reference may be made to 3GPP TS 23.402: Architecture enhancements for non-3GPP accesses, or the like.

Wi-Fi (registered trademark)-Calling is a Voice over IP (VoIP) service provided on a Wi-Fi (registered trademark) network by a communication carrier (operator). For example, a terminal (User Equipment (UE)) into which a SIM (Subscriber Identity Module) of a communication carrier is inserted is connected to a security gateway of the communication carrier via a Wi-Fi (registered trademark) network, and when authenticated with SIM authentication by the security gateway, the terminal (User Equipment (UE)) is connected to an exchange node of a core network (Evolved Packet Core: EPC), thereby making it possible for the terminal to use a voice call service based on a telephone number and Short Message Service (SMS), etc., each provided by the communication carrier (Non-Patent Literature 1). Further, when the terminal is connected to Wi-Fi (registered trademark) and Wi-Fi (registered trademark)-Calling is set on in the terminal, the security gateway, on reception of an incoming call to the terminal calls the terminal via a Wi-Fi (registered trademark) network.

FIG. 1 is a diagram illustrating an EPS including a non-3GPP access network. A terminal (UE) 1 such as a smartphone can connect to a packet data network (PDN) 30 via a base station (evolved Node B: eNB) 10 of a communication carrier and an EPC 20, or can connect to the Internet via a wireless LAN such as a Wi-Fi (registered trademark).

An MME (Mobility Management Entity) 23 of EPC 20 performs various processing such as mobility management and authentication of the terminal 1, setting of a user data transfer route, and the like. In addition, the MME 23 performs user authentication, or the like, in cooperation with an HSS 24 (Home Subscriber Server which holds subscriber profile). The MME 23 establishes/releases a user data transfer route in a section (S1-U) from an SGW (Serving Gateway) 21 to the base station 10. The SGW21 exchanges user data with the base station 10, for example, and establishes/releases a communication path between the SGW21 and a PGW (Packet Data Network) PDN 22. The PGW22 is connected to a packet data network (PDN) 30 such as IMS (Internet Multimedia Subsystem) or the Internet, for example.

Further, the PGW22 performs, for example, allocation of an IP address (private IP address) to the terminal 1, packet filtering for a user, charging support, lawful interception, packet screening, and so forth. A PCRF (Policy and Changing Rules Function) 26 determines a policy control such as QoS (Quality of Service) and a charging control rule. Based on notification information from the PCRF 26, the PGW22 and SGW21 perform policy control, on a per packet basis, for example. In FIG. 1, a line S11 or the like between respective nodes represents an interface, a broken line represents a control plane (C-Plane), and a solid line represents a signal (data) of a user plane (U-Plane). For details of the EPC, reference may be made to, for example, 3GPP TS 23.401: GPRS Enhancements for E-UTRAN Access or the like.

In Wi-Fi (registered trademark)-Calling, etc., a call request from the terminal 1 is forwarded, as an Un-Trusted Access (unreliable access), via a wireless LAN access point 41 and via an ePDG (evolved packet data gateway) 27 of a communication carrier to the PGW22, and is then connected to PDN 30 (for example, IMS service).

The ePDG 27 is an IPsec gateway that terminates an IPsec (Security Architecture for Internet Protocol) connection from a mobile interface (Swu). When the terminal (UE) 1 switches to a non-3GPP access that is not trusted in security, or the terminal (UE) 1 first connects to a non-3GPP access, the terminal 1 detects an ePDG 27 and performs key exchange (IKEv2) with the ePDG 27, and establishment of an IPsec tunnel, and then establishes a PDN (Packet Data Network) connection with the PGW22 over the established IPsec tunnel. In order for the terminal 1 to access the non-3GPP access network, it is necessary to perform authentication. The ePDG 27 relays an EAP (Extensible Authentication Protocol) message from the terminal 1 to a 3GPP AAA (Authentication Authorization Accounting) server 25. The 3GPP AAA server 25 performs EAP-SIM (Extensible Authentication Protocol-Subscriber Identity Module) Authentication, or EAP-AKA (Extensible Authentication Protocol-Authentication and Key Agreement) authentication (reference may be made to 3GPP TS 33.402: Security aspects of non-3GPP accesses, etc., for example).

The ePDG 27 sets up a tunnel (Proxy Mobile IP or GPRS (General Packet Radio System) Tunneling Protocol) toward the PGW22 in S2b interface (reference may be made to 3GPP TR 23.834: Study on GPRS Tunneling Protocol (GTP) based S2b etc., for example).

When the non-3GPP access complies with PMIPv6 (Proxy Mobile IPv6), it can connect to the PGW22 via a PMIPv6. In the case of using a proxy mobile IP between the PGW22 and the ePDG 27, when an IPsec tunnel is established between the terminal 1 and the ePDG 27, the ePDG 27 transmits a proxy binding update message to the PGW22. As a result, in the PGW22, a transmission destination of data to the terminal 1 is switched to the ePDG 27. It is noted that the PMIPv6 is a mobility control protocol that establishes and releases a tunnel for data transfer (GRE (Generic Routing Encapsulation) tunnel) between a mobility anchor (LMA: Local Mobility Anchor) and a mobility access gateway (MAG: Mobility Access Gateway) (reference may be made to IETF (The Internet Engineering Task Force) RFC (Request For Comments) 5213). The LMA forwards a packet to the MAG to which the terminal is connected (switches a communication route and forwards the packet addressed to the terminal to a visiting area). When the terminal moves from one MAG to another MAG, a tunnel for data transfer is established between the LMA that established the data transfer tunnel before, and a MAG to which the terminal newly connects.

The 3GPP AAA server 25 provides network access authentication, authorization, and accounting services from users. Authorization of non-3GPP access is performed among terminal 1, 3GPP AAA server 25, and HSS 24. For example, when the terminal 1 establishes an IPsec tunnel with the ePDG 27, mutual authentication is performed between the terminal 1 and the network based on, for example, EAP-AKA.

When the terminal 1 moves or first connects to the trusted non-3GPP access (trusted wireless LAN access point 42 in FIG. 1), the MIP (Mobile IP) tunnel (S2a, DSMIPv6 (Dual-Stack MIPv6): reference may be made to IETF RFC 5555) directly to the PGW22. As for ePDG and 3GPP AAA server, reference may be made, for example, to 3GPP TS 29.273: Evolved Packet System (EPS); 3GPP EPS AAA interfaces or the like. Whether the non-3GPP access network is a trusted access network or an untrusted access network is determined by, for example, a communication carrier (operator) of a HPLMN (Home Public Land Mobile Network) to which a subscriber is registered.

IPSec is a protocol that encrypts and authenticates packets at a network layer level. AH (Authentication Header) performs authentication of such as connection destination of a VPN (Virtual Private Network), presence or absence of tampering in a packet (reference may be made to IETF RFC 2402). ESP (Encapsulating Security Payload) performs packet encryption and authentication (connection destination/packet falsification) (reference may be made to IETF RFC 2406). For IPSec communication, there are a transport mode (IPsec between hosts on which IPsec is implemented) and a tunnel mode (IPsec between VPN apparatuses such as routers equipped with IPsec). In the transport mode, data of layer 4 or more of a packet is encrypted (see FIG. 11B), and the packet is forwarded based on an original IP header (Original IP header). In the tunnel mode, an original IP header and data part (FIG. 11A) of a packet are encrypted and a new IP header (New IP header) is added (see FIG. 11C).

An ESP packet has a format including an ESP header, a payload, an ESP trailer, and authentication data (ESP Authentication data) (see FIG. 11B and FIG. 11C). The ESP header (ESP header) includes an SPI (Security Parameter Index: a 32-bit value uniquely identifying an SA (Security Association) for that datagram), and a sequence number (sequence number of the packet: 32 bits). The ESP trailer includes a padding (padding field for adjusting payload length), a pad length (number of bytes of padding), a next header (Protocol after ESP: TCP (Transmission Control Protocol)/UDP (User Datagram Protocol)). Authentication data (HMAC (Hash-based Message Authentication Code)) is a variable length field including an Integrity Check Value (ICV) calculated from an ESP packet except authentication data.

A security association (SA), which is a logical connection, is established between VPN apparatuses for performing IPsec communication. Since SA is a one-way tunnel, two SAs are provided for transmission and reception of packets. SA is established for each traffic that performs VPN communication. SA includes IPsec parameters (security information) (e.g., SPI (Security Parameter Index), mode, protocol, cryptographic algorithm, key, authentication algorithm, IP address of tunnel endpoint, etc.).

IKE (Internet Key Exchange) is a key exchange protocol for SA setting (reference may be made to IETF RFC 4306, for example). ISAKMP (Internet Security Association and Key Management Protocol)_SA (Security Association) is an SA for encrypting control information of IKE for transmission and reception between peers.

[Non-Patent Literature 1]

Next-generation Wi-Fi Calling Using IMS and 3GPP Wi-Fi Access, Internet search (searched on 26, Apr. 2015) <URL: http://www.aptilo.com/wi-fi-callin/next-generation-wi-fi-calling-solution>

SUMMARY

Since a wide area network (WAN) such as the Internet is interposed between the data center and the wireless LAN (Local Area Network), it is necessary to establish a secure connection.

Filtering service, or the like provided by a communication carrier to a subscriber are provided on, for example, a packet core network (EPC) of the communication carrier. When a terminal (UE) switches to a wireless LAN connection, control by the packet core network (EPC) of the communication carrier may not be possible in some cases. Therefore, when the terminal connects to the Internet from the wireless LAN, there are cases where control such as parental control (children's too much use of the Internet by a child, and protection from a harmful site and harmful contents) and access rejection cannot be performed sufficiently. With respect to a parental control, although there are some terminals for a child, equipped with a parental control function (for example, a block of a harmful site, restriction of an application to be used, restriction of a party of telephone or e-mail, restriction of use time and talk time, etc.), measures for restriction other than the parental control function, needs to be taken by a guardian. In addition, a young people may happen to use a general terminal other than a so-called child-oriented terminal equipped with a parental control function or the like.

Accordingly, it is an object of the present invention to provide a system, a method, an apparatus, and a non-transitory medium for enabling to provide necessary protection to a terminal adapted to connect with a data center via a wireless LAN and a wide area network (WAN) such as the Internet, and provide secure communication.

According to one aspect of the present invention, there is provided a communication system comprising a data center with a wide area network being interposed between the data center and a wireless LAN (Local Area Network) to which a terminal connects, wherein the data center comprises:

a first gateway that connects with the terminal using a VPN (Virtual Private Network) through the first wide area network and the wireless LAN;

a second gateway that connects to a second wide area network;

a virtual network connected to the first gateway and the second gateway; and a function block that is provided between the first gateway and the second gateway and that performs filtering of at least one of a packet input from the first wide area network side and a packet input from the second wide area network.

According to another aspect of the present invention, there is provided a communication apparatus with a wide area network being interposed between the communication apparatus and a wireless LAN (Local Area Network) to which a terminal connects, the communication apparatus comprising:

a first gateway that connects with the terminal using a VPN (Virtual Private Network) through the first wide area network and the wireless LAN;

a second gateway that connects to a second wide area network;

a virtual network connected to the first gateway and the second gateway; and a function block that is provided between the first gateway and the second gateway and that performs filtering of at least one of a packet input from the first wide area network side and a packet input from the second wide area network.

According to one aspect of the present invention, there is provided a communication method comprising:

connecting a first gateway in a data center with a terminal by a VPN (Virtual Private Network) through a first wide area network and a wireless LAN, wherein the wide area network is interposed between the data center and the wireless LAN (Local Area Network) to which a terminal connects;

performing connection from the terminal via the VPN, from a virtual network and a second gateway provided in the data center to a second wide area network; and filtering at least one of a packet input from the first wide area network side and a packet input from the second wide area network.

According to one aspect of the present invention, there is provided a terminal adapted to connect with a data center via a wireless LAN (Local Area Network) and a wide area network (Wide Area Network), comprising:

an VPN (Virtual Private Network) apparatus that performs connection by a VPN (Virtual Private Network) between the terminal and the data center, through the wireless LAN and the wide area network, wherein the terminal connects, via the VPN, via a virtual core network in the data center virtualizing at least a part of the constituent elements of a core network, to a second wide area network (WAN2), a function to receive, via the VPN, an incoming call or data filtered in the data center, out of an incoming call or data destined to the terminal input to the data center from the second wide area network (WAN2).

According to another aspect of the present invention, there is provided a non-transitory computer readable medium storing a program causing a computer arranged in a data center with a wide area network being interposed between the data center and a wireless LAN (Local Area Network) to which a terminal connects, to execute processing comprising establishing a VPN (Virtual Private Network) through the wide area network and the wireless LAN between the terminal and the data center;

performing connection from the terminal via the VPN, a virtual network and a second gateway in the data center to a second wide area network; and filtering at least one of a packet input from the first wide area network side and a packet input from the second wide area network.

According to one aspect of the present invention, there is provided a non-transitory computer readable medium storing a program causing a computer included in a terminal adapted to connect with a data center via a wireless LAN (Local Area Network) and a wide area network (Wide Area Network), to execute processing comprising:

establishing a VPN (Virtual Private Network) through the wide area network and the wireless LAN between the terminal and the data center;

performing connection by a VPN (Virtual Private Network) between the terminal and the data center via the wireless LAN and via the wide area network;

connecting via the VPN to a virtual core network provided in the data center, the virtual core network virtualizing at least a part of the constituent elements of a core network, to a second wide area network (WAN2); and receiving via the VPN an incoming call or data filtered in the data center out of an incoming call or data destined to the terminal input to the data center from the second wide area network (WAN2).

According to the present invention, the non-transitory computer readable medium may be a storage such as a semiconductor memory, a CD (Compact Disk)/DVD (Digital Versatile Disk), or the like in which the program is recorded.

According to the present invention, it is possible to provide necessary protection to a terminal adapted to connect with a data center via a wireless LAN and a wide area network (WAN) such as the Internet, and provide secure communication.

Still other features and advantages of the present invention will become readily apparent to those skilled in this art from the following detailed description in conjunction with the accompanying drawings wherein only example embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3A is a diagram illustrating an embodiment of the present invention.

FIG. 3B is a diagram illustrating the VPN information storage unit of the gateway.

FIG. 3C is a diagram exemplifying the VPN information storage unit of the terminal.

DETAILED DESCRIPTION

The following describes example embodiments of the present invention. According to the present invention, in a communication system in which a virtualization core network is arranged in a data center of a cloud operator, a terminal connecting to the data center using access from a non-3GPP access network such as a wireless LAN is provided with necessary protection, thereby realizing a secure connection.

Various methods for realizing network functions by software have been proposed. For example, in SDN (Software Defined Network)/NFV (Network Function Virtualization), or the like, a plurality of network devices that individually require a casing are integrated on a server using virtualization technology. Regarding NFV, reference may be made to ETSI GS NFV-MAN 001 V1.1.1 (2014-12), etc. Virtualization such as evolved packet core (EPC), which is a core network of telecommunication carriers, is in progress.

In a virtualized EPC (vEPC), at least one or all of functions of nodes such as SGW, PGW, MME, HSS, PCRF, etc. are realized in software by an application operating on a virtual machine. For example, virtualized EPC may be realized on a general-purpose server or the like disposed in a data center (DC) of a cloud operator that provides a cloud service (or data center service) to a client.

Figure 1:
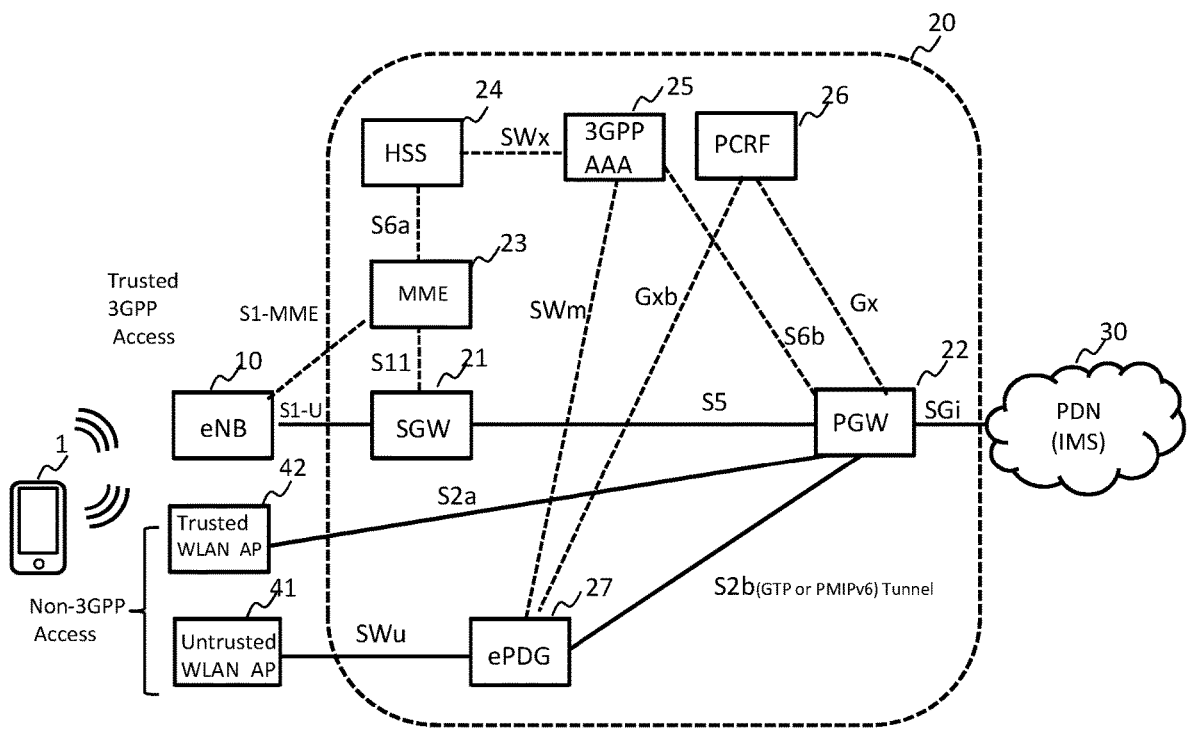
FIG. 1 is a diagram illustrating a related art.
Figure 2:
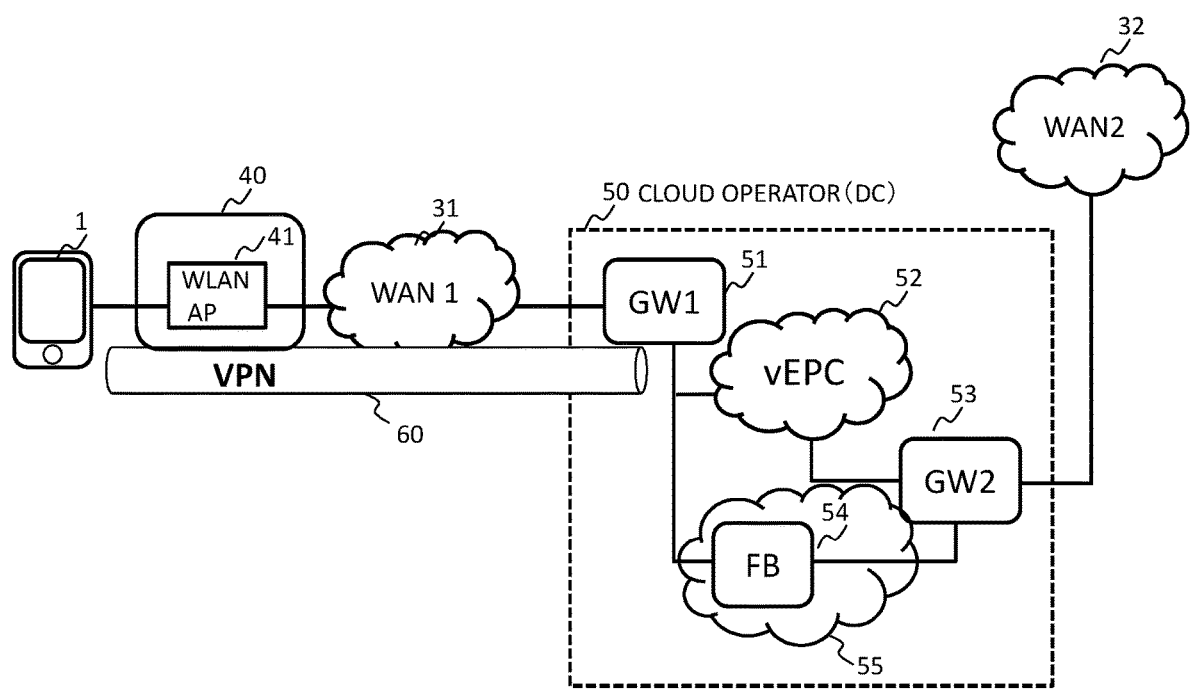
FIG. 2 is a diagram illustrating an embodiment of the present invention.

FIG. 2 is a diagram illustrating an example embodiment of the present invention. The virtualized EPC (vEPC) 52 in the data center 50 is a virtualized version of at least a part of the EPC 20 in FIG. 1. The vEPC 52 may be a virtualized version of function of some nodes of the EPC 20 such as ePDG 27, PGW22, PCRF 26, etc. of the EPC 20 in FIG. 1.

The first gateway 51 (GW1) connects the vEPC 52 to a wide area network (WAN) 1 (31) such as the Internet. The second gateway (GW2) 53 connects the WAN2 (32) such as the Internet and IMS to the vEPC 52.

In this embodiment, in the data center 50, a function block (FB) 54 that performs packet filtering, data compression, or the like on a network (virtual network) 55 between the first gateway 51 and the second gateway 53.

The function block (FB) 54 can be allocated to each user (terminal 1: subscriber). For example, based on service contract information of the terminal 1 acquired from a subscriber profile repository (SPR) (not shown) by a PCRF (not shown) of the vEPC 52, and a private IP address allocated to the terminal 1 by a PGW (not shown) of the vEPC 52, the function block (FB) 54 may be allocated to the terminal 1 that accesses the data center 50 on a per terminal basis.

Although not particularly limited thereto, the functional block (FB) 54 may be implemented as a virtual machine running on a server connected between the first gateway (GW1) 51 and the second gateway (GW2) 53. In this case, for example, the function block (FB) 54 allocated to the terminal 1 (subscriber) may be activated based on subscriber information, the service contract information, etc., of the terminal 1, according to a connection request from the terminal. The function block (FB) 54 may be terminated in response to a connection termination, or the like from the terminal 1 (subscriber).

The function block (FB) 54 is configured to perform filtering control of a packet (downlink) input to the second gateway 53 from the WAN2 (32) side. The function block (FB) 54 may is configured to perform filtering control of a packet (uplink) from the terminal 1 to the WAN2 (32) side. The function block (FB) 54 is arranged between the first gateway (GW1) 51 and the second gateway (GW2) 53. But, the arrangement of function block (FB) 54 is not limited to this. The function block (FB) 54 may be mounted on a server constituting at least one of the first gateway (GW1) 51 and the second gateway (GW2) 53.

The terminal 1 connects to the WAN2 (32) via the wireless LAN 40, and through the WAN1 (31), the first gateway 51, the vEPC 52, and the second gateway 53 in the data center 50. In FIG. 2, a wireless LAN 40 may be a home wireless LAN or a public wireless LAN. The wireless LAN 40 includes a wireless LAN access point (WLAN AP), a wireless LAN router equipped with NAT (Network Address Transformation)/NAPT (Network Address Port Translation) the like, and connects to the WAN1 (31) via a modem or the like.

In the present embodiment, in order to explain a connection mode in which the terminal 1 connects to the data center 50 via the wireless LAN 40 and the WAN1 (31), a connection destination of the terminal is set to a wireless LAN access point (WLAN AP) 41. However, the terminal 1 may, as a matter of course, switch a connection destination to a 3GPP access network (for example, eNB 10 in FIG. 1), may connect to the WAN1 (31) via a packet core network (EPC 20 in FIG. 1) and connect to the data center 50.

A VPN tunnel is established between the gateway apparatus (GW) (for example, 51) in the data center 50 and the terminal 1. In the gateway apparatus 51, a VPN apparatus (VPN router) may be implemented on the gateway 51 and function as VPN gateway. The terminal 1 is equipped with a VPN apparatus and functions as a VPN client. In the terminal 1, the VPN connection with the data center 50 is set via the wireless LAN 40. The VPN connection includes tunneling and encryption. When the WAN1 (31) is the Internet, this VPN is a so-called Internet VPN.

In FIG. 2, in the case of providing a service such as voice call, SMS, etc. to the terminal 1, in the data center 50, for example, via the first gateway 51, the vEPC 52, the second gateway 53, and via the WAN2 (32), connection is made to a target terminal of voice communication or SMS message communication. On the other hand, a packet (traffic) for data communication between the terminal 1 and the WAN2 (32) may be offloaded such that the packet does not pass through the vEPC 52, but is transmitted to the network (virtual network) 55 in the data center 50.

However, it goes without saying that in FIG. 2, a voice packet may be transferred to the network 55 between the first gateway 51 and the second gateway 53 of the data center 50. It is a matter of course that a data packet (data communication) between the terminal 1 and the WAN2 (32) may be forwarded through the vEPC 52 in the data center 50.

It is noted that the function block 54 of the data center 50 may be configured as a packet filter type firewall that accepts/rejects a packet based on a packet header information (address, port number, protocol, etc.). However, the present invention is not limited to such a configuration, and may include a state-full inspection function (in which a connection is established between a proxy and a connection destination which is established by an application gateway (connection from the terminal is a proxy (firewall) that performs filtering at an application layer (seventh layer) such as HTTP (Hypertext Transfer Protocol) or FTP (File Transfer Protocol)), a session table is created based on the packet header information (address, port number, protocol, etc.), and controls communication based on a direction and state of the communication. The application gateway type can restrict inappropriate browsing of Web sites, or the like.

Since the private IP address is assigned to the terminal 1 connected to the wireless LAN/3GPP access network and the address/port number is converted by NAT/NAPT, a packet having the private IP address set as a destination or a source in a header of the packet does not flow. In order to block IP address spoofing, the function block 54 may be configured to reject packets destined for the private IP address.

In the case where the WAN2 (32) is an IMS (IP Multimedia Subsystem), for example, a SIP (Session Initiation Protocol) message transmitted from the terminal 1 is sent from a proxy session control function P-CSCF (Proxy Call Session Control Function) to a serving session control function S-CSCF (Serving Call Session Control Function) on a home network side of the IMS and analyzed, and then a SIP message is sent to a S-CSCF on a called side or media gateway control function MGCF. From the S-CSCF on the called side, the Internet, another IMS, or a MGW (Media Gateway) between an IP network and an existing telephone network, or from a SGW (Signaling Gateway) that is provided between a Circuit Switched (CS) network and the IP network and terminates a call control signal from an SS7 common line signaling network and converts the call control signal to a call control signal on the IP network, a communication service is provided to a line switching domain or the like.

Alternatively, in the data center 50, at least a part of the IMS function may be implemented on the virtual network 55. For example, a function of a SIP server (for example, P-CSCF) or the like may be implemented on the virtual network 55. The filter 54 may be operated on a virtual machine, wherein content filtering for analyzing and blocking contents of a speech and a call rejection list for prohibiting an incoming call from an inappropriate number may be provided. It is noted that a configuration in which a control apparatus including content filtering and a call rejection list prohibiting incoming from an inappropriate number is not implemented on a virtual machine but implemented as a real apparatus connected between the first and second gateways 51 and 53.

Although not particularly limited thereto, the first gateway 51 as a VPN gateway, performs such processing as follows:
  Establishment of a VPN tunnel between first gateway 51 and the terminal 1 via a wireless LAN, and WAN1;
  Negotiation of security parameters;
  User authentication;
  Assigning private IP addresses;
  Data encryption and decryption;
  Management of security keys;
  Management of data transfer via a VPN tunnel;
  Management of transmission and reception data transmission as an endpoint of a VPN tunnel or a router, and so forth.

It is noted that assignment of private IP addresses may be performed not by the gateway 51 but by PGW or the like in the vEPC 52.

As a VPN tunneling protocol, PPTP (Point-to-Point Tunneling Protocol), L2TP (Layer 2 Tunneling Protocol), IPsec, GRE (Generic Route Encapsulation) and the like may be used, for example. The protocol that performs encryption is IPsec. When IPsec is used as the VPN tunneling protocol, as described above, it is encapsulated by the ESP protocol. For IPSec-SA setting, key exchange is performed by IKE protocol (in IKE, port 500 of UDP (User Datagram Protocol) is used).

For example, since a wireless LAN router or the like connects to a plurality of terminals (VPN clients), it has a NAPT function that converts a private IP address and a global IP address of a terminal, and a port number in a Transmission Control Protocol (TCP)/User Datagram Protocol (UDP) header.

Figure 11A:
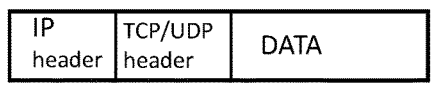
FIG. 11A illustrates an IP packet.
Figure 11B:
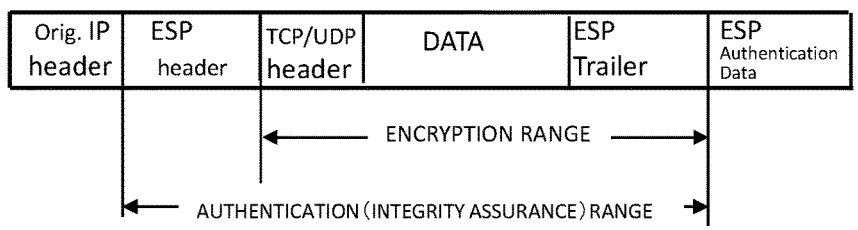
FIG. 11B illustrates an ESP packet in a transform mode.
Figure 11C:
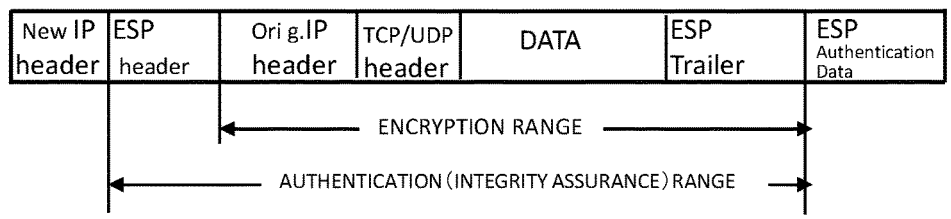
FIG. 11C illustrates a tunnel mode ESP packet.
Figure 11D:
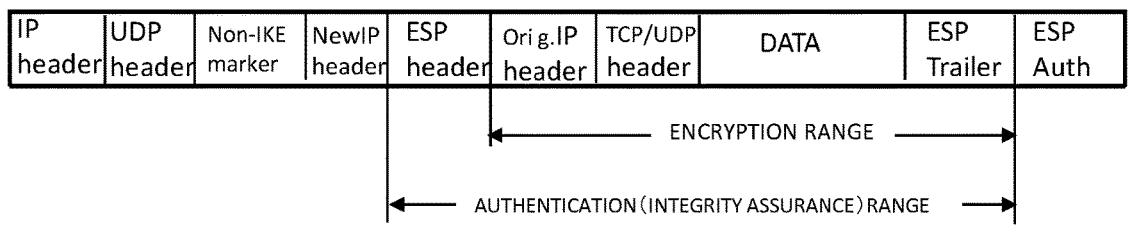
FIG. 11D illustrates a UDP encapsulation.

In a tunneling mode of IPSec, an IP header and a data portion (FIG. 11A) are collectively encrypted, and a new IP header (New IP Header in FIG. 11C) is added and transmitted (IETF RFC 4303). In NAPT, an IP address field of an IP header and a port number of a TCP/UDP header are changed. In an ESP protocol, as shown in FIG. 11C, an ESP header (SPI, Serial Number) is placed next to the IP header, and there is no port number field in the ESP header. Therefore, NAPT for address translation does not work. That is, if a NAPT exists between the terminal 1 and the first gateway 51 in FIG. 2, the VPN using IPsec will not be established by the NAPT In this case, in order to make IPsec VPN correspond to NAPT, as shown in FIG. 11D, UDP encapsulation (UDP Encapsulation of IPsec Packets) method in which a UDP header is added to the ESP packet, may be used. In the case of a UDP capsulation, in FIG. 11D, the first IP header is an IP header used for forwarding, and source and destination port numbers of the added UDP header are 500 which is the same port number used in IKE. When the port number is changed by NAT/NAPT, the changed number is used as it is. A checksum field (checksum) of the added UDP header is set to 0. A non-IKE marker following the UDP header is setting information for distinguishing it from the IKE packet (in which 0 is entered). This is to indicate that the packet is not an IKE packet, because the port number of the added UDP header uses the same port number as the port number of the IKE packet. In this portion of the IKE packet, a cookie (cookie) value, for example, a cookie value generated by an initiator of the negotiation of ISAKMP_SA and a cookie value generated by a response side of the negotiation of ISAKMP_SA are included.

Figure 11E:
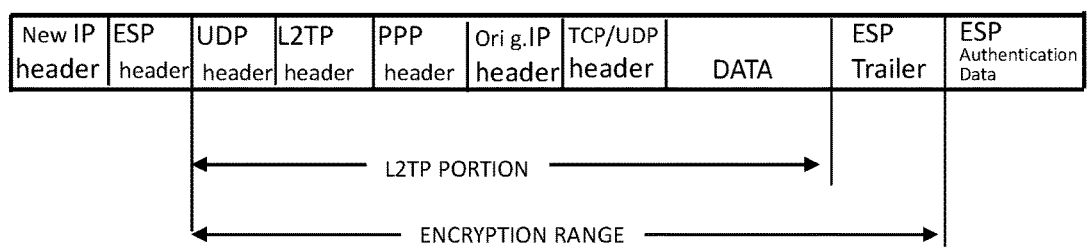
FIG. 11E illustrates a packet of L2TP/IPsec FIG.

L2TP, by encapsulating a Point-to-Point Protocol (PPP) frame with UDP, enables exchange the encapsulated frame over the IP network and realizes VPN between two sites, LAC (L2TP Access Concentrator) and LNS (L2TP Network Server). L2TP/IPsec is a protocol that performs encryption by IPsec in L2TP which does not have a mechanism of encryption. In L2TP/IPsec, a connection (SA) by IPSec is first established. FIG. 11E is a diagram illustrating a packet format of L2TP/IPsec.

In order to make a VPN tunnel correspond to NAT/NAPT, in addition to UDP encapsulation, a NAT traversal method that automatically detects NAT by detecting a change in an IP address or a port number may be used.

Next, a procedure of setting up a VPN tunnel using IPsec between the VPN client (terminal 1) and the VPN gateway (GW 51) will be described
  (1) Key generation information is generated and exchanged from a pre-shared key set with a communication partner by IPsec communication, an IKE SA (ISAKMP SA) is established, and the key is created from the key creation information (IKE Phase 1). Note that the authentication algorithm, the encryption algorithm, and the pre-shared key are the same between the VPN client (terminal 1) and the VPN gateway (GW 51).

(2) Next, an IPsec tunnel for data communication is set up. Communication on IKE SA is performed and SA for data communication is established. If the authentication algorithm and key are the same as those of the connection destination, IPsec SA is established. A key for communication with IPsec SA (IKE Phase 2) is created. IPsec disappears within a certain time. IKE SA is kept for a long time as compared with IPsec SA.

(3) Next, encryption and decryption are performed on data to be encrypted using the encryption algorithm and a key created by IPsec SA. The encrypted data is transferred over IPsec SA. As the encryption algorithm, DES (Data Encryption Standard), 3DES (Triple Data Encryption Standard), or the like may be used, and MD5 (Message Digest Five), SHA-1 (Secure Hash Algorithm) or the like is used as the authentication algorithm.

FIG. 3A is a diagram illustrating a configuration of the terminal 1 and the VPN apparatus of the first gateway 51 in the data center 50. A VPN setting unit 512 of the VPN apparatus 511 of the first gateway 51 controls VPN setting and stores setting information in the VPN information storage unit 513. A VPN communication control unit 514 controls the connection of the VPN tunnel (IKE phases 1 and 2), and controls communication of data communication via the VPN tunnel by encryption and decryption. The terminal 1 has the same configuration.

In the case of IPsec VPN, when setting the VPN tunnel in the first gateway 51, the VPN setting unit 512 sets a VPN identifier (VPN tunnel identifier) for identifying the VPN, a pre-shared key, a communication target (name, etc.), an authentication algorithm, an encryption algorithm, presense or absense of IKE keep-alive (when disconnecting VPN, reconnecting). Furthermore, a network address (IP address+ netmask) of a route is set as routing information. Furthermore, the presence/absence of user authentication by XAUTH (eXtended AUTHENTICATION) and presence/ absence of NAT traversal are set. XAUTH encrypts and exchanges a user name and a password between a VPN remote client and a server after IKE phase 1 (apparatus authentication), and performs user authentication.

Also in the VPN setting unit 102 of the VPN apparatus 101 of the terminal 1, a setting name, a pre-shared key, a client name, a connection destination gateway (IP address or name), an authentication algorithm, an encryption algorithm, a connection destination network, presence/absence of NAT traversal, etc. are set.

In the VPN information storage unit 513 may include, for example,

IKE cryptographic algorithms (3DES-CBC (Cipher Block Chaining Mode), DES-CBC, AES (Advanced Encryption Standard)-CBC);

IKE hash algorithm (MD5, SHA-1);

Encapsulation of ESP (Encapsulated by UDP and transmitted/received so as to enable IPsec communication in an environment not able to pass ESP by NAT);

Pre-shared key (pre-shared-key);

The policy of SA (for example, policy identifier (Policy_ID), VPN gateway identifier (gateway), authentication header (AH), authentication algorithm, a network identifier of an own apparatus's side and a network identifier of a target side);

Transport mode definition (source port list, destination port list), and

Presence or absence of NAT traversal, and so forth.

These items of information may be set by the command input by the VPN setting unit.

FIG. 3B is a diagram illustrating one example of the VPN management information set by the VPN setting unit 512 and stored in the VPN information storage unit 513. The VPN is given a VPN identifier and managed for each terminal (user). In FIG. 3B, a connection partner IP address is a private IP address (local IP address) of the VPN client (terminal 1) allocated by the first gateway 51 or the like (DHCP server). The terminal ID/name of the connection destination may be an ID of the terminal 1 (for example, IMSI (International Mobile Subscriber Identity)) or the user ID. The apparatus address is an IP address of the VPN tunnel side of the first gateway 51 (router). A connection network is a network to which the VPN communication is transmitted, and is a network address of the VPN tunnel side. In the example of FIG. 3B, an IP address assigned to the terminal 1 in FIG. 3A is set to 100.1.100.1 and an IP address assigned to a connection network is set to 100.1.100.1 (net mask: 32) which is an IP address assigned to the terminal 1. A packet addressed to the terminal 1 from the data center 50 is searched by a wireless LAN router connected to the WAN1 (31) and transmitted via the wireless LAN access point connected to the corresponding port to the terminal 1 by VPN.

In a case where a plurality of wireless LAN access points are included in one WLAN, in addition to the IP address of the terminal 1, the terminal ID, or the like, as VPN management information, for example, there may be provided a name of a wireless LAN access point name (APN) of the connection destination of the terminal 1, or port information of a wireless LAN router to which the wireless LAN access point connects, or the like. It is noted that the VPN information shown in FIG. 3B is an example, and it is as a matter of course that the present invention is not limited to such a configuration.

FIG. 3C is a diagram illustrating an example of VPN management information set by the VPN setting unit 102 of the VPN client terminal 1 and stored in the VPN information storage unit 103. A connection destination may be designated by a host name of the site (for example, Fully Qualified Domain Name (FQDN) of the data center 50). The connection network is a network to which a VPN communication from the VPN client (terminal 1) is transmitted and is a network address of a VPN tunnel side of the first gateway 51. A connection network is set to a VPN side address of the first gateway 51: 100.1.1.0/24 (netmask: 24).

The VPN communication control units 514 and 104 terminate the VPN tunnel, manage the security key, manage the data transfer via the VPN tunnel, control transmission of the transmission/reception data as the VPN tunnel end point or the router, encrypt the data and packet transfer by encapsulation, decapsulation and decryption of a packet.

In FIG. 3B and FIG. 3C, an example of IPv4 (Internet Protocol Version 4) is illustrated, but it is a matter of course that it is not limited to IPv4. Also, IP addresses in FIG. 3B and FIG. 3C are imaginary addresses.

In FIG. 3B and FIG. 3C, an example in which an IPsec tunnel is used as the VPN tunnel has been described, but when L2TP/IPsec is used, an L2TP tunnel is arranged in the IPsec tunnel. A connection control message and a session control message are used for establishing the L2TP tunnel. When constructing a VPN with L2TP/IPsec, a session is established by a session control message after creating a tunnel with a connection control message.

As described above, the VPN is allocated in units of terminals (terminal ID, common account). In FIG. 3B, in addition to a user ID, a field of the terminal ID/name may be a user account (for example: "aaa@example.com") provided to the user by a cloud company of the data center 50. That is, in the first gateway 51, in addition to an IP address of the terminal 1 (VPN client), information specific to a user (a user account or a Web mail address, etc.) may be used for management of the VPN.

When the terminal 1 first accesses the wireless LAN access point 41, the wireless LAN access point 41 forwards an access request packet from the terminal 1 to the main data center 50 via the WAN1 (31). The first gateway 51 of the data center 50 assigns an IP address (private IP address) to the terminal 1 and puts up a VPN tunnel 60. When the VPN tunnel 60 is an IPsec tunnel, the establishment of IKE SA (IKE phase) 1, and the establishment of IPsec SA (IKE phase 2) are performed as described above, and encrypted communication is performed on the IPsec SA.

Figure 4:
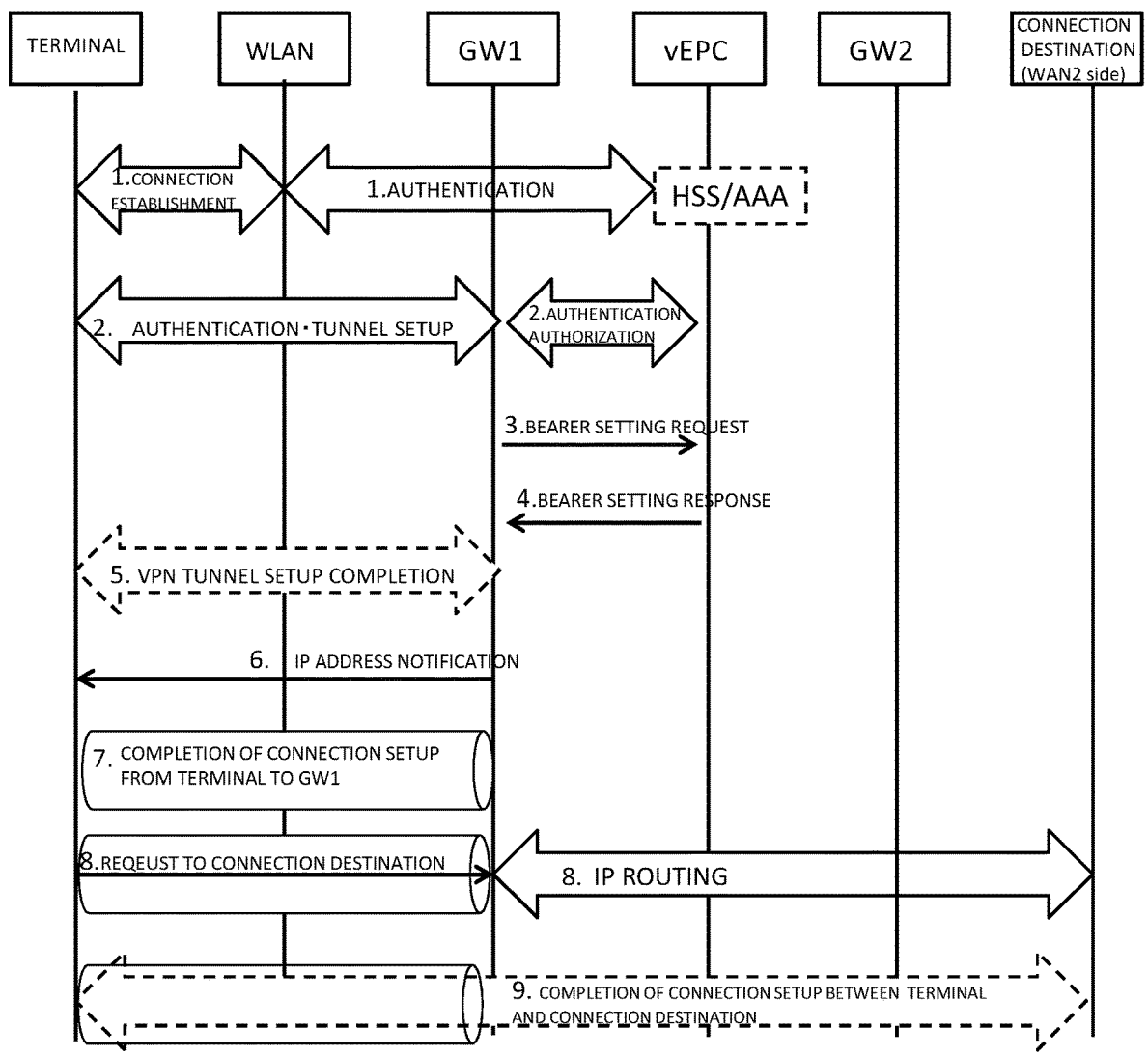
FIG. 4 is a diagram illustrating an operation of an embodiment of the present invention.

FIG. 4 is a diagram illustrating an example of an attach process of the terminal 1 and a sequence to be connected to a connection destination that is connected to the WAN2 (32) in the system of the embodiment of FIG. 2. In FIG. 4, there is schematically shown an example of an operation sequence of the terminal 1, the WLAN 40 (WLAN AP), the first gateway 51, the vEPC 52, the second gateway 53 (GW2), and the connection destination on the side of the WAN2 (32) in FIG. 2. The numbers assigned to each sequence operation are sequence numbers for explanation.

1. The terminal 1 establishes a connection with the wireless LAN (WLAN) 40, and authentication and authorization (authentication & authorization) is performed by, for example, HSS/AAA (not shown) in the vEPC 52. In the example of FIG. 4, it is assumed that the first gateway 51 is set as a gateway to which the terminal 1 is connected, when accommodating the wireless LAN 40 which is non-3GPP wireless access (Untrusted Non-3GPP IP Access) which is not reliable for security.
2. From the terminal 1 side, the IKE authentication/tunnel setup procedure with the first gateway (GW1) 51 is executed. This corresponds to the IKE phases 1 and 2 described above. It may be an IKEv2 authentication tunnel setup.
3. The vEPC 52 includes an SGW and a PGW. When the setting of the bearer is required, the first gateway (GW1) 51 may function as an MME and transmit a bearer setting request (Create Session Request) to the SGW. In this case, a PGW connected to the packet data network of the connection destination is selected, and a GTP (GPRS (General Packet Radio System) Tunneling Protocol) tunnel is established in the S8 interface between the SGW and the PGW.
4. A bearer setting response (Create Session Response) is transmitted from the SGW of the vEPC 52 to the first gateway (GW1) 51 functioning as the MME.
5. This completes the setup of the IPsec VPN tunnel.
6. The IP address assigned to the terminal 1 is notified to the terminal 1 from the first gateway (GW1), using the IKEv2 message.
7. The IP connection from the terminal 1 to the first gateway (GW1) is set at this point. The above corresponds to the sequence of the attach process.
8. Upon reception of a connection request to the connection destination on the WAN2 (32) side from the terminal 1 side, IP routing from the first gateway (GW1) 51 to the connection destination (WAN2 side) is performed.
9. This completes the setting of connection, from the terminal 1 via the VPN and the vEPC 52 of the data center 50, with the connection destination on the WAN2 side. A packet in a downlink direction from the WAN2 (32) side to the terminal 1 is forwarded by the PGW in the vEPC 52 to the first gateway 51 according to a policy such as PCRF, and then forwarded from the first gateway 51 via the VPN tunnel 60 to the terminal 1.

Figures 5A, 5B:
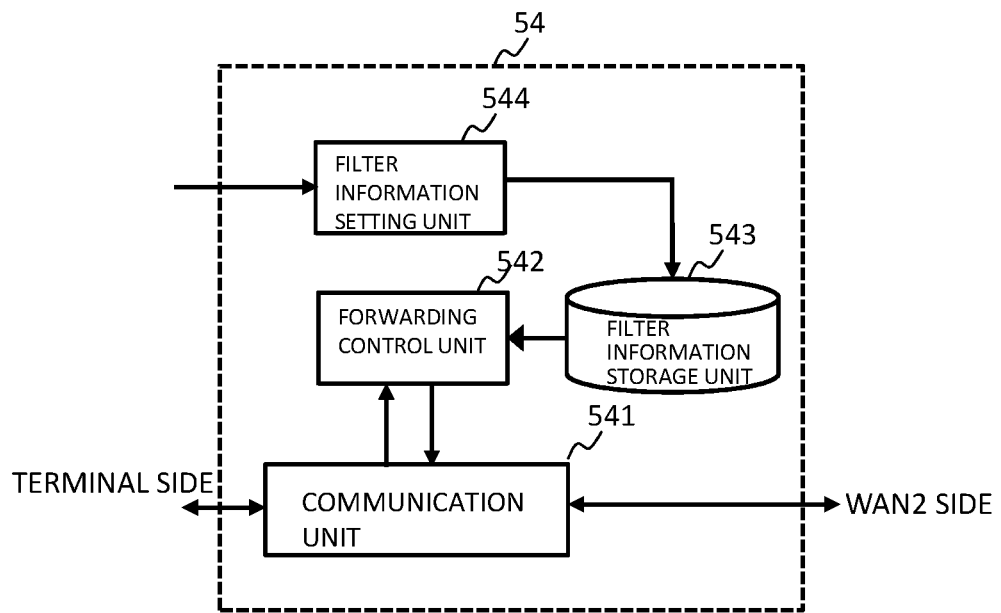
FIG. 5A and FIG. 5B are diagrams illustrating functional blocks according to an embodiment of the present invention.

FIG. 5A is a diagram showing an example of a configuration of the function block 54 in FIG. 3. Referring to FIG. 5A, the function block 54 includes a communication unit 541, a filter information storage unit 543, a transfer control unit 542, and a filter information setting unit 544. The communication unit 541 receives a packet and causes a permitted packet to perform voice communication under control of the transfer control unit 542.

The filter information storage unit 543 stores filter information for controlling discarding and passing of a packet.

The communication unit 541 extracts an address, a port, and a protocol from a header of a packet received, compares the extracted information with a condition in the filter information storage unit 543, determines rejection and permission of the packet, and notifies the communication unit 541 of the determination result.

The filter information setting unit 544 sets filter information in the filter information storage section 543. The filter information setting unit 544 may set the filter information in the filter information storage unit 543 from a management terminal (not shown) in the data center 50 of FIG. 2 or from a bearer resource correction request from the terminal 1 or the like.

The filter information setting unit 544 sets filter information in the filter information storage section 543. The filter information setting unit 544 may set the filter information in the filter information storage unit 543 from a management terminal (not shown) in the data center 50 of FIG. 2 or from a bearer resource correction request from the terminal 1 or the like. The function block 54 may be equivalently provided for each terminal 1, in accordance with the filter information for each terminal 1 set by the filter information setting unit 544.

FIG. 5B shows an example of packet filter information as the configuration of the filter information storage unit 543 of FIG. 5A. Referring to FIG. 5B, a type (handling of packet conforming to filter condition: passing or discarding), direction (direction of filter evaluation: a direction from a wireless LAN to WAN2 to WAN2 is set to UP, from WAN2 to a wires LAN is set DOWN). A protocol (IP protocol of a packet to be filtered), a source address (source IP protocol of a packet to be filtered), a transmission port (a source port of a packet to be filtered), a destination address Destination IP protocol of a packet to be subjected to packet), a destination port (destination port of a packet to be filtered), and the like For the filter ID=1, a packet from a port 23 (telnet) to the first gateway (GW1) 51 may be discarded (blocking the telnet port (23)). For filter ID=2, a packet destined for a private IP address of terminal 1 may be discarded. For filter ID=3, a packet destined to a specific destination address from the terminal 1 is discarded. Note that the symbol "*" in FIG. 5B represents arbitrary (any).

In FIG. 5B, the filter information of filter ID=2, 3, etc. is information unique to terminal 1 (subscriber). It is a matter of course that the filter information of filter ID=1 (a packet with destination GW1, transmission port=23) in FIG. 5B may be included in the filter information corresponding to terminal 1 (subscriber).

When allocating the function block 54 for each terminal (subscriber) in the function block 54 of FIG. 5B, the filter information of FIG. 5B may be set for each terminal (subscriber) by the filter information setting unit 544. The filter information may be managed in association with the terminal, and other units such as the transfer control unit 542, the communication unit 541, and the filter information setting unit 544 may be realized by using common codes for a plurality of terminals. In the data center 50, regarding the management of the terminal 1 (subscriber), a user account assigned to a user by the data center 50 may be used for a user of the terminal 1.

Figure 6:
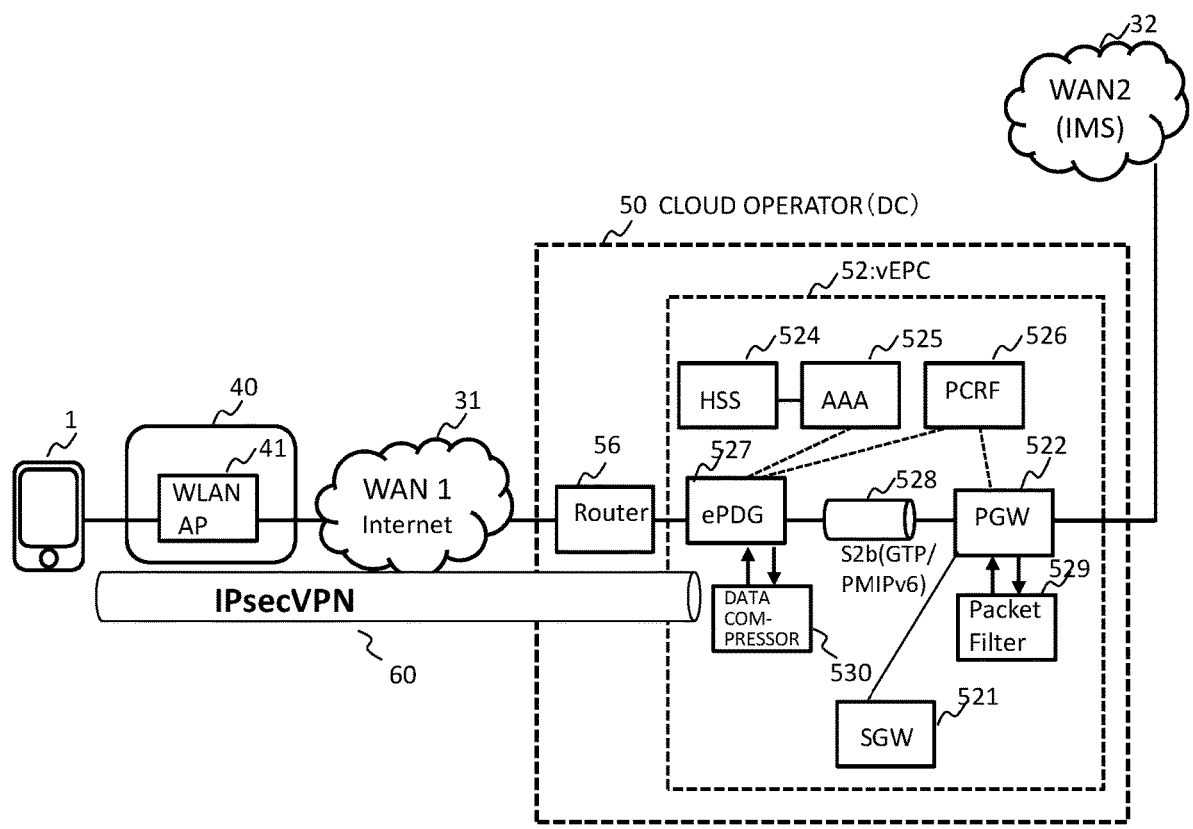
FIG. 6 is a diagram illustrating an embodiment of the present invention.

FIG. 6 is a diagram illustrating an example of the above-described embodiment. Referring to FIG. 6, an IPsec tunnel is established between the ePDG 527 of the vEPC 52 in the data center 50 and the terminal 1. The ePDG 527 functions as a VPN gateway and terminates the VPN tunnel.

The ePDG 527 functions as a VPN gateway to perform the followings:
Establishment of a VPN (IPsec) tunnel with the terminal 1 via the wireless LAN 40, and WAN1 (31);
Negotiation of security parameters;
User authentication;
Assigning a private IP address to terminal 1;
Data encryption and decryption;
Management of security keys;
Management of data forwarding via VPN tunnel; and
Management of transmission and reception of data as an endpoint of VPN tunnel.

It is noted that the assignment of the private IP address to the terminal 1 may be performed by the PGW 522 of the vEPC 52.

The EAP message is transmitted to the ePDG 527 from the terminal 1 using IKEV2, and relayed to the 3GPP AAA server 525 of the vEPC 52, where the EAP-SIM/EAP-AKA authentication is performed. The ePDG 527 of the vEPC 52 and the PGW 522 are connected via GTP or PMIPv6 tunnel.

In the case where a proxy mobile IP (PMIPv6 tunnel) is used between the PGW 522 and the ePDG 527 in the vEPC 5, when an IPsec tunnel is established between the terminal 1 and the ePDG 527 of the vEPC 52, the ePDG 527 transmits a proxy binding update (Proxy Binding Update) to the PGW 522. As a result, in the PGW 522 of the vEPC 52, the destination of an incoming call to the terminal 1 is switched to the ePDG 527 of the vEPC 52, and the incoming call is notified to the terminal 1 via the VPN tunnel 60 and via the wireless LAN 40.

The PGW 522 includes, for example, a packet filter 529 having a TFT (Traffic Flow Template) related to an EPS bearer. The packet filter 529 functions as the function block 54 and may be provided for each terminal 1. As described above, filter information (discarding of a packet, etc.) in the packet filter 529 may be provided for each terminal (subscriber).

The setting (addition, modification, deletion, etc.) in a downstream direction from the WAN2 to the terminal 1 side and in an upstream direction from the terminal 1 to the WAN2 in the packet filter 529 may be performed with a Request Bearer Resource Modification message (reference may be made to 3GPP TS 23.401, etc.) of the bearer resource correction procedure from the terminal 1.

Alternatively, setting of the filter information in the packet filter 529 may be performed in connection processing such as an Attach Request message or the like from the terminal 1, or at an occurrence of a predetermined event, or the like. It is a matter of course that the filter 529 may be configured to have a function of performing filtering in an application layer or to have stateful inspection function. Alternatively, the filter 529 may be provided with a call rejection list for rejecting incoming calls from the WAN2 (32).

When the WAN2 (32) is configured by IMS, P-CSCF (Proxy-Call Session Control Function) and Serving-CSCF connected to vEPC 52 may be configured to have content filtering that analyzes contents of voice for blocking and a call rejection list for prohibiting incoming calls from inappropriate numbers.

It is noted that the SGW 521 is connected to an access to the data center 50 from the 3GPP access network not shown.

In FIG. 6, another function block 54 may be provided in addition to the packet filter 529. In the example of FIG. 6, as the function block 54, a data compressor 530 is connected to the ePDG 527. The data compressor 530, in accordance with capability information or model information of the terminal 1, may change a compression ratio of data of a payload portion of a packet to be transferred to the terminal 1. Alternatively, the data compressor 530 may be connected to the PGW 522 and the data compressor 530 may variably control a compression ratio of data to be transmitted to the WAN2 (32).

In FIG. 6, the ePDG 527 and the PGW 522 are implemented as the vEPC 52. However, the ePDG 527 and the PGW 522 may be ePDG 27 and PGW22 (FIG. 1) of MNO (Mobile Network Operator) that a cloud operator as MVNO (Mobile Virtual Network Operator) has borrowed from the MNO.

For example, regarding Wi-Fi (Registered Trademark)-Calling from the terminal 1, a VPN 60 (IPsec tunnel) via the wireless LAN 40 and WAN1 (31) is established between the terminal 1 and the ePDG 527 and a tunnel of GTP/PMIPv6 is established between the ePDG 527 and the PGW 522, and connection is made from the PGW 522 to a connection destination via the WAN2 (32) composed of IMS, for example. That is, Wi-Fi (registered trademark)-Calling is controlled as a communication service by a cloud operator (MVNO) to provide a secure connection and through the filter 529 provide protection from unauthorized incoming calls and harmful sites etc. Note that the PGW 522 has a function of the second gateway 53 in FIG. 3.

Figure 7:
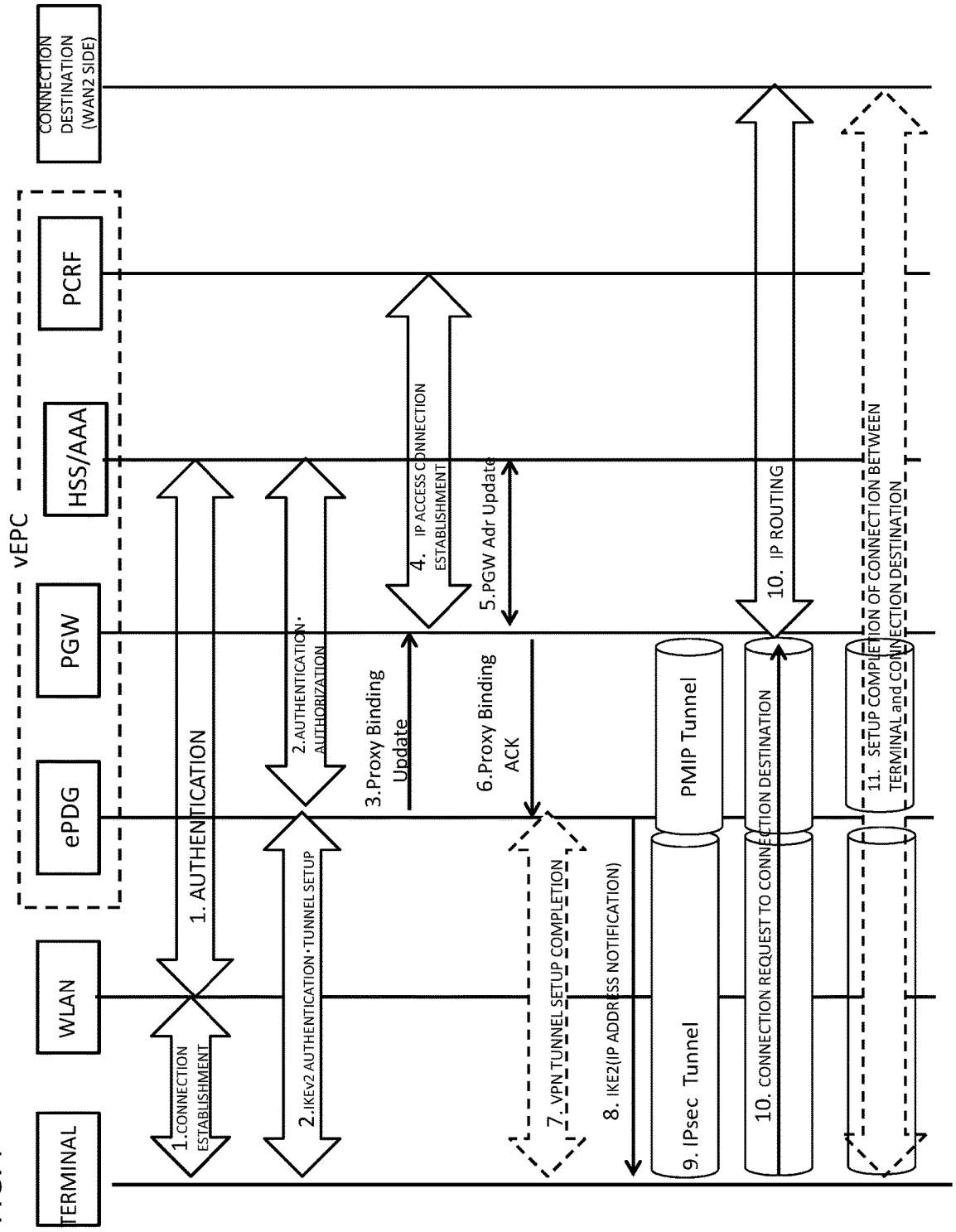
FIG. 7 is a diagram illustrating an operation of the embodiment of FIG. 6.

FIG. 7 is a diagram illustrating an attach processing of the terminal 1 and a sequence for communication connection to a connection destination that connects to the WAN2 (32) in the system of FIG. 6. FIG. 7 illustrates an example of an operation sequence in the terminal 1, WLAN 40 (WLAN AP), ePDG 527, PGW 522, HSS 524/AAA server 525, PCRF 526, and a connection destination on side of WAN2 (32) in FIG. 6. The numbers assigned to each sequence operation are sequence numbers for explanation. In FIG. 7, for example, when replacing the ePDG 527 with the first gateway (GW1) and replacing the PGW 522 with the second gateway (GW2), the operation can partially correspond to the operation described with reference to FIG. 4.

1. The terminal 1 establishes a connection with the wireless LAN (WLAN) 40, and performs authentication/authorization (Authentication & Authorization), for example, by the HSS 524/AAA 525 in the vEPC 52.
2. From the terminal 1 side, the IKEv2 authentication/tunnel setup procedure between the ePDG 527 and the terminal 1 (IKEv2 phases 1 and 2, etc.) is executed.
3. The ePDG 527 transmits to the PGW 522 a Proxy Binding Update (request message transmitted by MAG (Mobile Access Gateway) to LMA (Local Mobility Anchor), in order to establish a binding between a mobile node's home network prefix and the MAG to which the mobile node is connected).

4. The PGW 522 cooperates with the PCRF 526 to establish an IP connection access network (IP-CAN (Connection Access Network)) session.
5. The PGW 522 notifies the AAA server 525 of identification information (PGW ID) of the PGW, and the AAA server 525 notifies the HSS 524 of an ID of the PGW 522 and an APN (Access Point Name) corresponding to the terminal 1 for registration.
6. The PGW 522 performs a proxy binding update processing and creates a binding cache entry corresponding to the terminal 1. As a result, the PGW 522 transmits a packet addressed to the terminal 1 to the ePDG 527 in accordance with contents held in the binding cache entry. The PGW 522 transmits a Proxy Binding Ack to the ePDG 527
7. The above completes the setup of the IPsec VPN tunnel.
8. An IP address is notified from the ePDG 527 to the terminal 1 by an IKEv2 message.
9. Setup of IP connection from the terminal 1 is completed. An Psec tunnel between the terminal 1 and the ePDG 527 and a tunnel such as PMIP (Proxy Mobile Internet Protocol) between the ePDG 527 and the PGW 522 are established. The above corresponds to the sequence of the attach process.
10. When a connection request from the terminal 1 side to a connection destination of the WAN2 (32) side is received from the ePDG 527 via the PMIP tunnel, IP routing from the PGW 522 to the connection destination (WAN2 side) is performed. In this case, a SIP message from the terminal 1 is transmitted to the P-CSCF of the IMS via the second gateway 53 and is connected via S-CSCF, MGCF, and MGW to the connection destination of PSTN (Public Switched Telephone Networks), for example. Alternatively, it may be connected from the S-CSCF to the Internet or a connection destination connected to the other IMS. In FIG. 6, it is assumed that the terminal 1 has already been registered in the IMS. The P-CSCF of IMS and the PGW 522 (SGi interface) communicate with IPsec (VPN).
11. This completes the setting of the connection with the connection destination on the WAN2 side via the VPN from the terminal 1 and the vEPC 52 of the data center 50. A packet in a downlink direction from the WAN2 (32) side to the terminal 1 is forwarded to the ePDG 527 via the PIMP tunnel to the ePDG 527 by the PGW 522 in the vEPC 52 based on a binding cashe entry, and forwarded from the ePDG 527 to the terminal 1 via the VPN tunnel 60.

Figure 10:
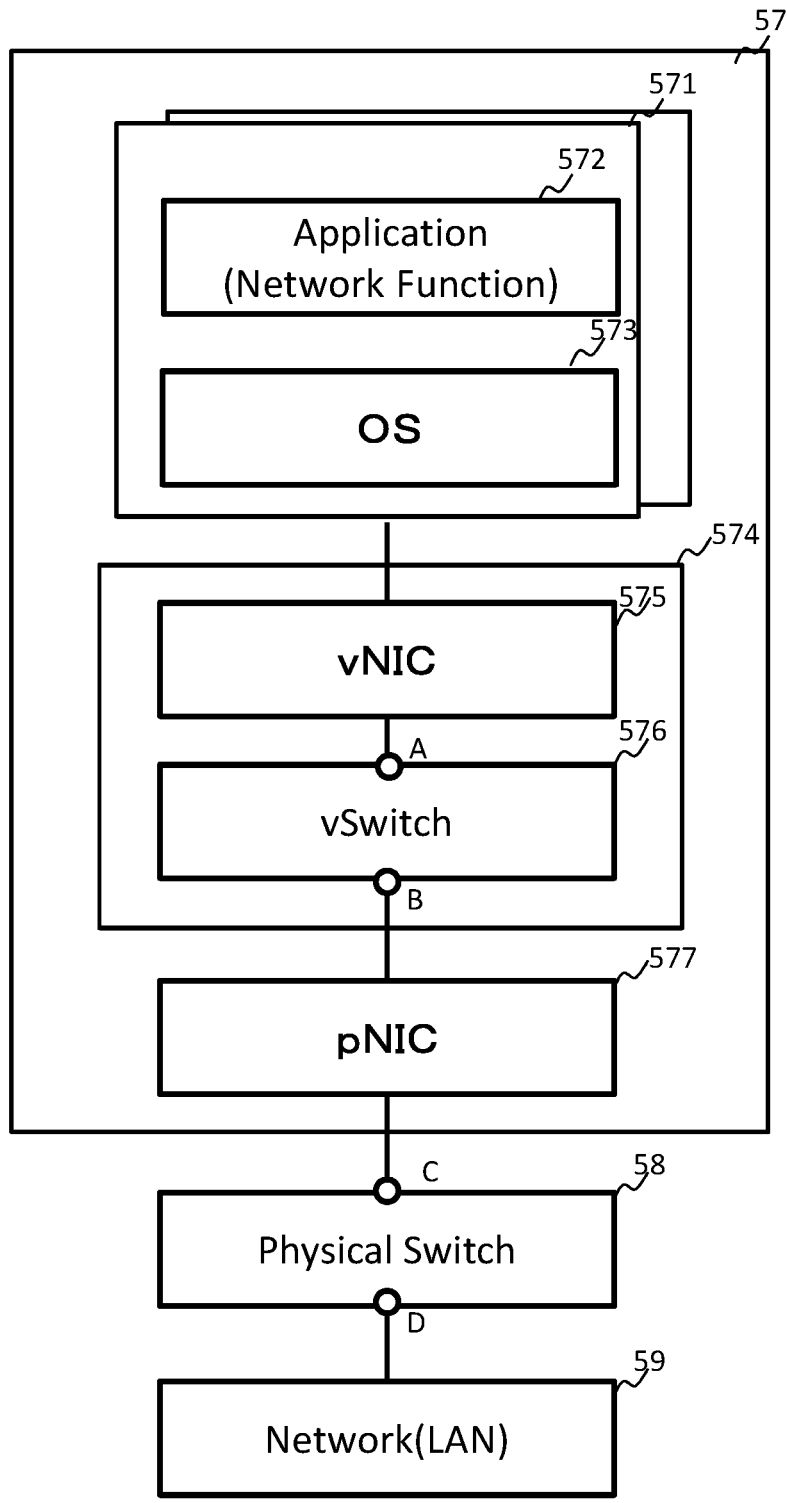
FIG. 10 is a diagram illustrating a configuration of a virtualization apparatus.

The following describes a configuration of the node of vEPC 52 with reference to FIG. 10. A virtual machine (VM) 571 on a server 57 in the data center 50 connects to a virtual port: A of a virtual switch (vSwitch) 576 via a virtual network interface controller (vNIC) 575, and is connected from a virtual port: B of the virtual switch (vSwitch) 576 to a physical port C of a physical switch (Physical Switch) 58 via a physical NIC (pNIC) 577 and is connected to the physical port C of the physical switch 58 through a physical port D of the physical switch 58 to a network (virtual network) 59 such as a LAN. The virtual machine 571 includes a guest OS (Operating System) 573 and an application 572 to realize a part or all of functions of the EPC network node (for example, functions of the ePDG 527 in FIG. 6, or functions of other nodes). The network 59 is connected, for example, to the first gateway (router) 51 in FIG. 6.

A virtual NIC (vNIC), a virtual switch (vSwitch), and the like are provided by a hypervisor 574 which is a virtualization mechanism on the server 57. It is noted that the physical switch 58 may be configured by an L2 (Layer 2) switch and the network 59 may be configured by a virtual network such as a VLAN (Virtual LAN).

Likewise, the function block 54 of FIG. 2 may be implemented by the virtual machine 571 of FIG. 10 and the network 55 of FIG. 2 may be configured by a virtual network 59, such as a VLAN. In FIG. 10, management units of NFV (Network Functions Virtualization) (NFV Orchestrator (NFVO), and VNF (Virtualized Network Function) Manager, or the like), that is a manager that manages and integrates virtualization of network functions are omitted.

Figure 8:
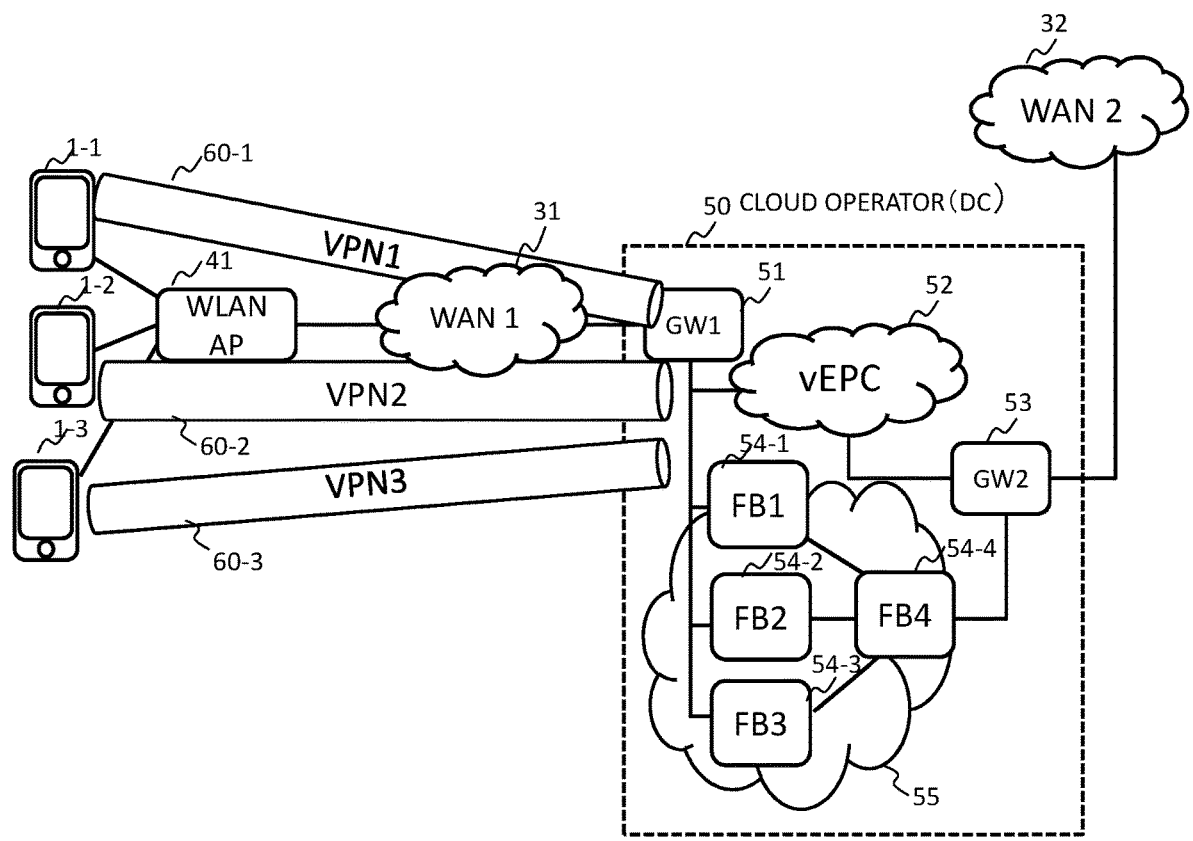
FIG. 8 is a diagram illustrating another embodiment of the present invention.

FIG. 8 is a diagram illustrating another example embodiment of the present invention. In the embodiment shown in FIG. 8, terminals 1-1, 1-2, and 1-3 complying with the vEPCs 52 of the data centers 50 of a plurality of cloud providers access a single wireless LAN access point 41.

The data center 50 manages a VPN for each of the terminals 1-1 to 1-3 and each user account, and accommodates a plurality of VPN tunnels 60-1 to 60-3 at the same time. The configuration, and operation of each of the terminals 1-1 to 1-3 are the same as those in the above embodiment.

The data center 50 includes a plurality of function blocks 54-1 to 54-3 connected to the VPNs 60-1 to 60-3 via the first gateway (GW1) 51, and a function block 54-4 connected between a plurality of function blocks 54-1 to 54-3, and the second gateway (GW2) 53.

The function blocks 54-1 to 54-3 each may perform setting of a packet to be filtered (parental control, access rejection, etc.) from the user side. The function block 54-4 may perform setting of a packet to be filtered (for example, a packet from a specific area, site, etc.) from a maintenance terminal or a control device (not shown) of the cloud operator of the data center 50. When setting the function blocks 54-1 to 54-3 from the user side, it may be set from the terminal 1 side by a request message to the data center 50. Alternatively, based on contract information of a user of the terminal 1 with the cloud operator that provides the vEPC 52 at the data center 50, a maintenance terminal or a control device (not shown) on the cloud operator side possessing the data center 50, setting of a filter target may be performed for the function blocks 54-1 to 54-3.

When a plurality of terminals connects to one wireless LAN access point 41, a plurality of terminals share a radio wave for communication, and when a plurality (many) terminals access one wireless LAN access point 41, throughput (such as an amount of data transfer per unit time) of each terminal is reduced. Therefore, there may be provided a wireless LAN controller (not shown) that that controls to disperse load by allocating as a connection destination of a plurality of terminals, a wireless access point different from the wireless access point with access concentrated, when a plurality of terminals connects to one wireless LAN access point 41, access to which is concentrated.

Figure 9:
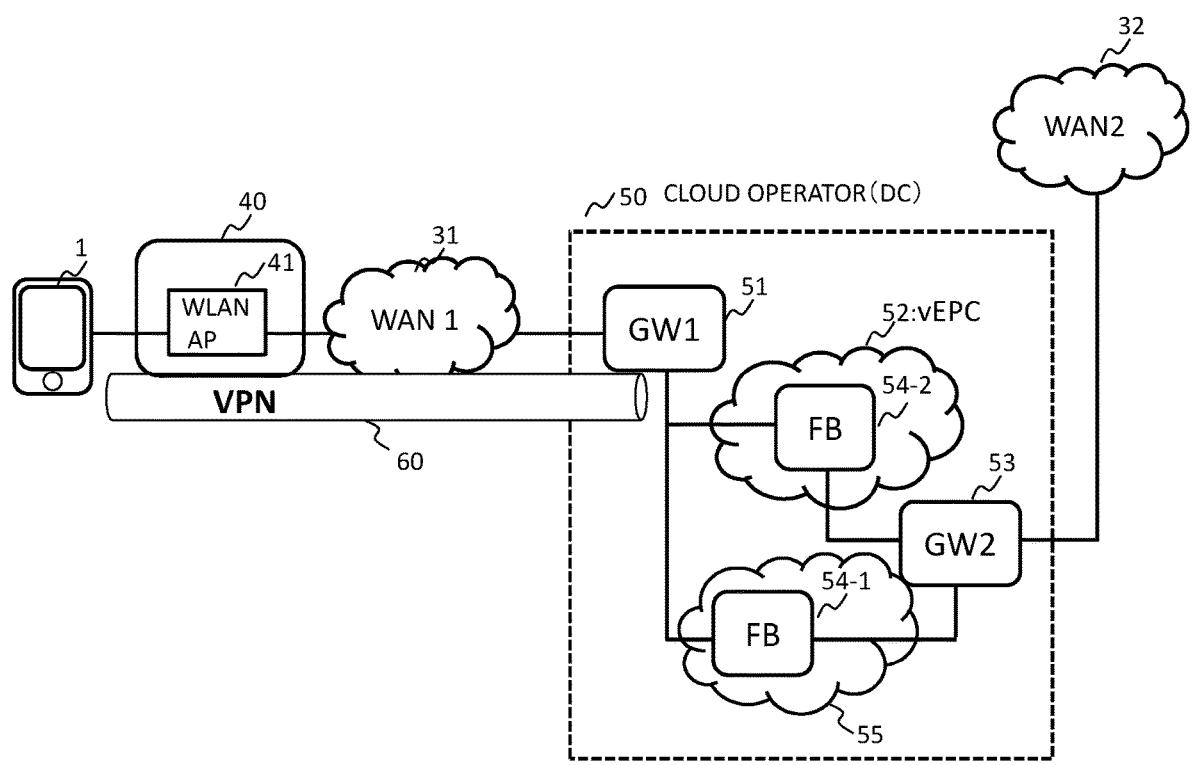
FIG. 9 is a diagram illustrating another embodiment of the present invention.

FIG. 9 is a diagram illustrating still another embodiment of the present invention. Referring to FIG. 9, in this embodiment, in addition to the function block 54-1 on the virtual network 55 between the first gateway (GW1) and the second gateway (GW2), a function block 54-2 is provided in the vEPC 52. For example, the function block 54-1 performs filtering of a packet for data communication. The function block 54-2 in the vEPC 52 may perform rejection of an incoming call from a telephone number specified by a user and permission of SMS and an incoming call from a telephone number specified by the user. The function block 54-1 and the function block 54-2 may be configured such that filter information is set equivalently for each terminal 1, and the function block may be equivalently provided for each terminal 1.

The function block 54-2 may be implemented by virtualizing at least a part of function of a SIP server of IMS to connect to, for example, a PGW to perform control of rejection or permission of an incoming call. Alternatively, as described with reference to FIG. 6, it is as a matter of course that the function of the function block 54-2 may be added to a packet filter (529 in FIG. 6) with TFTs thereof being managed by the PGW of the vEPC 52.

The function block 54-1 between the first gateway (GW1) and the second gateway (GW2) may forward a packet from the WAN2 (32) to the terminal 1 side, by changing a compression rate of a compression coding of data of the packet so as to be adapted to a capability and a type of the terminal based on capability information etc. of the terminal 1 (SDP (Session Description Protocol, etc.), and then may forward from the first gateway to the terminal 1. In this case, the function block 54-1 may perform transcoding processing in which data (compression-coded data) of a packet received by the second gateway from the WAN2 (32) is once decoded and then re-encoded by changing a compression ratio. In the transcoding processing, a bit rate, frame rate, resolution, etc. may be changed. For example, it is possible to reduce a network load, improve transfer efficiency, and effective utilization of a bandwidth by compressing data size to be downloaded to the terminal 1.

The disclosure of the above Non Patent Literature 1 is incorporated herein by reference. Within the framework of the entire disclosure (including the scope of claims) of the present invention, it is possible to change/adjust the embodiment or example based on the basic technical concept. Also, various combinations or selections of various disclosed elements (including each element of each claim, each element of each embodiment, each element of each drawing, etc.) are possible within the scope of the claims of the present invention. That is, it goes without saying that the present invention includes various modifications and modifications that could be made by those skilled in the art according to the entire disclosure including the claims, and technical concepts.

The above-described embodiments may be attached, for example, as follows (but not limited to the following).

(Supplementary Note 1)

A communication system comprising a data center with a wide area network being interposed between the data center and a wireless LAN (Local Area Network) to which a terminal connects, wherein the data center comprises:

a first gateway that connects with the terminal using a VPN (Virtual Private Network) through the first wide area network and the wireless LAN;

a second gateway that connects to the second wide area network, a virtual network connected to the first gateway and the second gateway; and a function block that is provided between the first gateway and the second gateway and that performs filtering of at least one of a packet input from the first wide area network side and a packet input from the second wide area network.

(Supplementary Note 2)

The communication system according to supplementary note 1, wherein the virtual network includes a virtual packet core network virtualizing at least a part of functions of a packet core network.

(Supplementary Note 3)

The communication system according to supplementary note 2, wherein in the data center, the function block includes at least one of a first function block connected between the first gateway and the second gateway; and a second function block connected to the virtual packet core network.

(Supplementary Note 4)

The communication system according to any one of supplementary notes 1 to 3, wherein in the data center, the function block further includes a function block that controls access rejection and permission of an incoming call and a text message destined to the terminal.

(Supplementary Note 5)

The communication system according to any one of supplementary notes 1 to 4, wherein in the data center, the function block further includes a function block that controls compression of data in a payload portion of at least one of a packet input from the second wide area network side and a packet input from the terminal side through the first wide area network.

(Supplementary Note 6)

The communication system according to any one of supplementary notes 1 to 5, wherein in the data center, the function block further includes a function block that is provided for each terminal and that packet filtering for the terminal, and/or access rejection and permission of an incoming call and a message destined to the terminal are/is set for each terminal.

(Supplementary Note 7)

The communication system according to supplementary note 3, wherein in a service of a voice call or a text message provided to the terminal via the wireless LAN, the terminal communicates with a connection destination, from the VPN via the virtual packet core network of the data center and the second wide area network, an incoming call or a message permitted by the second functional block connected to the virtual packet core network of the data center, among the incoming calls or messages destined to terminal from the second wide area network side, is transmitted through the VPN to the terminal.

(Supplementary Note 8)

The communication system according to supplementary note 3 or 7, wherein in a data communication service provided to the terminal via the wireless LAN, the terminal connects from the VPN to the second wide area network via the virtual network of the data center, the first function block connected between the first gateway and second gateway of the data center, filters data from the second wide area network side and a permitted packet is transmitted to the terminal via the VPN.

(Supplementary Note 9)

The communication system according to supplementary note 1 or 2, wherein first to Nth terminals (N is an integer of 2 or more) connecting to one wireless LAN access point and the first gateway of the data center are connected by first to Nth VPNs, in the data center,
the function block includes
first to Nth functional blocks respectively connected to the first to Nth VPN that are terminated by the first gateway, and
an (N+1)th function block having one end connected to the first to Nth function blocks and having the other end connected to the second gateway,
wherein setting of the first to Nth functional blocks are performed from user sides of the first to Nth terminals, while setting of the (N+1) th function block is performed on the data center side.

(Supplementary Note 10)

The communication system according to any one of supplementary notes 1 to 9, wherein the first gateway manages the VPN between the terminal and the first gateway on a per terminal basis or on a per terminal user basis.

(Supplementary Note 11)

A communication apparatus with a wide area network being interposed between the communication apparatus and a wireless LAN (Local Area Network) to which a terminal connects, comprising:

a first gateway that connects with the terminal using a VPN (Virtual Private Network) through the first wide area network and the wireless LAN;
a second gateway that connects to the second wide area network,
a virtual network connected to the first gateway and the second gateway; and
a function block that is provided between the first gateway and the second gateway and that performs filtering of at least one of a packet input from the first wide area network side and a packet input from the second wide area network.

(Supplementary Note 12)

The communication apparatus according to supplementary note 11, wherein the virtual network includes a virtual packet core network virtualizing at least a part of functions of a packet core network.

(Supplementary Note 13)

The communication apparatus according to supplementary note 12, wherein the function block includes at least one of a first function block connected between the first gateway and the second gateway; and
a second function block connected to the virtual packet core network.

(Supplementary Note 14)

The communication apparatus according to any one of supplementary notes 11 to 13, wherein the function block further includes a function block that controls access rejection and permission of an incoming call and a text message destined to the terminal.

(Supplementary Note 15)

The communication apparatus according to any one of supplementary notes 11 to 13, wherein in the data center, the function block further includes a function block that controls compression of data in a payload portion of at least one of a packet input from the second wide area network side and a packet input from the terminal side through the first wide area network.

(Supplementary Note 16)

The communication apparatus according to any one of supplementary notes 11 to 15, wherein in the data center, the function block further includes a function block that is provided for each terminal and that packet filtering for the terminal, and/or access rejection and permission of an incoming call and a message destined to the terminal are/is set for each terminal.

(Supplementary Note 17)

The communication apparatus according to supplementary note 13, wherein in a service of a voice call or a text message provided to the terminal via the wireless LAN, the terminal communicates with a connection destination, from the VPN via the virtual packet core network of the communication apparatus and the second wide area network, an incoming call or a message permitted by the second functional block connected to the virtual packet core network of the communication apparatus, among the incoming calls or messages destined to terminal from the second wide area network side, is transmitted through the VPN to the terminal.

(Supplementary Note 18)

The communication apparatus according to supplementary note 13 or 17, wherein in a data communication service provided to the terminal via the wireless LAN, the terminal connects from the VPN to the second wide area network via the virtual network of the data center, the first function block connected between the first gateway and second gateway of the communication apparatus, filters data from the second wide area network side and a permitted packet is transmitted to the terminal via the VPN.

(Supplementary Note 19)

The communication apparatus according to supplementary note 11 or 12, wherein first to Nth terminals (N is an integer of 2 or more) connecting to one wireless LAN access point and the first gateway of the data center are connected by first to Nth VPNs, in the data center,
the function block includes
first to Nth functional blocks respectively connected to the first to Nth VPN that are terminated by the first gateway, and
an (N+1)th function block having one end connected to the first to Nth function blocks and having the other end connected to the second gateway,
wherein setting of the first to Nth functional blocks are performed from user sides of the first to Nth terminals, while setting of the (N+1) th function block is performed on the data center side.

(Supplementary Note 20)

The communication apparatus according to any one of supplementary notes 11 to 19, wherein the first gateway manages the VPN between the terminal and the first gateway on a per terminal basis or on a per terminal user basis.

(Supplementary Note 21)

A communication method comprising:

connecting a first gateway in a data center with a terminal by a VPN (Virtual Private Network) through a first wide area network and a wireless LAN, wherein the wide area network is interposed between the data center and the wireless LAN (Local Area Network) to which a terminal connects;
performing connection from the terminal via the VPN, a virtual network and a second gateway in the data center to a second wide area network; and filtering at least one of a packet input from the first wide area network side and a packet input from the second wide area network.

(Supplementary Note 22)

The communication method according to supplementary note 21, wherein in the data center, the virtual network includes a virtual packet core network virtualizing at least a part of functions of a packet core network.

(Supplementary Note 23)

The communication method according to any one of supplementary notes 21 or 22, wherein the data center controls compression of data in a payload portion of at least one of a packet input from the second wide area network side and a packet input from the terminal side through the first wide area network.

(Supplementary Note 24)

The communication method according to any one of supplementary notes 21 to 23, wherein in the data center, the function block further includes a function block that is provided for each terminal and that packet filtering for the terminal, and/or access rejection and permission of an incoming call and a message destined to the terminal are/is set for each terminal.

(Supplementary Note 25)

A terminal adapted to connect with a data center via a wireless LAN (Local Area Network) and a wide area network (Wide Area Network), to execute processing comprising:

an VPN (Virtual Private Network) apparatus that performs connection between the terminal and the data center, using a VPN (Virtual Private Network) through the wireless LAN and the wide area network, the terminal connecting through the VPN to a virtual core network provided in the data center, the virtual core network virtualizing at least a part of the constituent elements of a core network, and via the virtual core network to a second wide area network (WAN2); and a function that receives via the VPN an incoming call or data filtered in the data center out of one or more incoming calls or data destined to the terminal input to the data center from the second wide area network (WAN2).

(Supplementary Note 26)

The terminal according to supplementary note 25, comprising a function that sets filtering of the function block provided in the data center.

(Supplementary Note 27)

A non-transitory computer-readable medium storing therein a program causing a computer arranged in a data center with a wide area network being interposed between the data center and a wireless LAN (Local Area Network) to which a terminal connects, to execute processing comprising establishing a VPN (Virtual Private Network) through the wide area network and the wireless LAN between the terminal and the data center;

performing connection from the terminal via the VPN, a virtual network and a second gateway in the data center to a second wide area network; and filtering at least one of a packet input from the first wide area network side and a packet input from the second wide area network.

(Supplementary Note 28)

A non-transitory computer-readable medium storing therein a program causing a computer included in a terminal adapted to connect with a data center via a wireless LAN (Local Area Network) and a wide area network (Wide Area Network), to execute processing comprising:

establishing a VPN (Virtual Private Network) through the wide area network and the wireless LAN between the terminal and the data center;

connecting through the VPN to a virtual core network provided in the data center, the virtual core network virtualizing at least a part of the constituent elements of a core network, and via virtual core network to a second wide area network (WAN2); and receiving via the VPN an incoming call or data filtered in the data center out of one or more incoming calls or data destined to the terminal input to the data center from the second wide area network (WAN2).

The invention claimed is:

1. A communication system comprising
a data center of a cloud operator, the data center providing a communication service to a terminal via a first wide area network to which the data center connects, and a wireless LAN (Local Area Network) to which the terminal connects, wherein the data center comprises:
a first gateway configured to connect with the terminal using a VPN (Virtual Private Network) established between the first gateway and the terminal through the first wide area network and the wireless LAN and terminate the VPN;
a second gateway configured to connect to a second wide area network,
a virtual network connected to the first gateway and the second gateway; and
a function block that is provided between the first gateway and the second gateway and that performs, based on filter information, filtering of a first packet transmitted by the terminal using the VPN and received by the first gateway from the first wide area network, and a second packet destined to the terminal and received by the second gateway from the second wide area network, the function block comprising a plurality of function blocks between the first gateway and the second gateway, each of the plurality of function blocks corresponding to one of a plurality of terminals accessing the data center via the VPN established between the terminal and the first gateway through the wireless LAN and the first wide area network.

2. The communication system according to claim 1, wherein the virtual network includes
a virtual packet core network virtualizing at least a part of functions of a packet core network.

3. The communication system according to claim 2, wherein in the data center, the function block includes:
at least one of a first function block connected between the first gateway and the second gateway; and
a second function block connected to the virtual packet core network.

4. The communication system according to claim 1, wherein in the data center, the function block further includes
a function block that controls access rejection and permission of an incoming call and a text message destined to the terminal.

5. The communication system according to claim 1, wherein in the data center, the function block further includes
a function block that controls compression of data in a payload portion of at least one of a packet input from the second wide area network side and a packet input from the terminal side through the first wide area network.

6. The communication system according to claim 1, wherein in the data center, the function block further includes
a function block that is provided for each terminal and that performs packet filtering for the terminal, and/or access rejection and permission of an incoming call and a message destined to the terminal are/is set for each terminal.

7. The communication system according to claim 3, wherein in a service of a voice call or a text message provided to the terminal via the wireless LAN, the terminal communicates with a connection destination, through the VPN, via the first gateway, the virtual packet core network, and the second gateway of the data center and via the second wide area network, and
an incoming call or a message permitted by the second functional block connected to the virtual packet core network of the data center, among the incoming calls or messages destined to the terminal from the second wide area network side, is transmitted, via the virtual packet core network and the first gateway, through the VPN to the terminal.

8. The communication system according to claim 3, wherein in a data communication service provided to the terminal via the wireless LAN, the terminal connects, through the VPN, via the first gateway, the virtual network, and the second gateway of the data center, to the second wide area network,
the first function block connected between the first gateway and second gateway of the data center, filters a packet input from the second wide area network side, and
the packet input from the second wide area network side and permitted by the first function block is transmitted, via the first gateway through the VPN to the terminal.

9. The communication system according to claim 1, wherein first to Nth terminals (N is an integer of 2 or more) connecting to one wireless LAN access point and the first gateway of the data center are connected by first to Nth VPNs,
wherein in the data center, the function block includes:
first to Nth function blocks respectively connected to the first to Nth VPN that are terminated by the first gateway; and
an (N+1)th function block having one end connected to the first to Nth function blocks and having the other end connected to the second gateway,
wherein setting of the first to Nth function blocks are performed from user sides of the first to Nth terminals, while setting of the (N+1) th function block is performed on the data center side.

10. The communication system according to claim 1, wherein the first gateway manages the VPN between the terminal and the first gateway on a per terminal basis, on a per terminal user basis, or on a per user account basis, the user account provided by the cloud operator to a user of the terminal.

11. A communication apparatus included in a data center of a cloud operator, the data center providing a communication service to a terminal via a first wide area network to which the data center connects, and a wireless LAN (Local Area Network) to which the terminal connects, the communication apparatus comprising:
a first gateway configured to connect with the terminal using a VPN (Virtual Private Network) established between the first gateway and the terminal through the first wide area network and the wireless LAN and terminate the VPN;
a second gateway configured to connect to a second wide area network,
a virtual network connected to the first gateway and the second gateway; and
a function block that is provided between the first gateway and the second gateway and that performs, based on filter information, filtering of a first packet transmitted by the terminal using the VPN and received by the first gateway from the first wide area network, and a second packet destined to the terminal and received by the second gateway from the second wide area network, the function block comprising a plurality of function blocks between the first gateway and the second gateway, each of the plurality of function blocks corresponding to one of a plurality of terminals accessing the data center via the VPN established between the terminal and the first gateway through the wireless LAN and the first wide area network.

12. The communication apparatus according to claim 11, wherein the virtual network includes
a virtual packet core network virtualizing at least a part of functions of a packet core network.

13. The communication apparatus according to claim 12, wherein the function block includes:
at least one of a first function block connected between the first gateway and the second gateway; and
a second function block connected to the virtual packet core network.

14. The communication apparatus according to claim 11, wherein the function block further includes
a function block that controls access rejection and permission of an incoming call and a text message destined to the terminal.

15. The communication apparatus according to claim 11, wherein in the data center, the function block further includes
a function block that controls compression of data in a payload portion of at least one of a packet input from the second wide area network side and a packet input from the terminal side through the first wide area network.

16. The communication apparatus according to claim 11, wherein in the data center, the function block further includes
a function block that is provided for each terminal and that performs packet filtering for the terminal, and/or access rejection and permission of an incoming call and a message destined to the terminal are/is set for each terminal.

17. A communication method comprising:
connecting a first gateway in a data center of a cloud operator with a terminal by a VPN (Virtual Private Network) established between the first gateway and the terminal through a first wide area network to which the data center connects and a wireless LAN (Local Area Network) to which a terminal connects, the data center providing a communication service to the terminal;
performing connection from the terminal via the VPN, the first gateway that terminates the VPN, a virtual network and a second gateway in the data center to a second wide area network to which the data center connects; and
filtering, based on filter information, by a function block provided between the first gateway and the second gateway, a first packet transmitted by the terminal using the VPN and received by the first gateway from the first wide area network, and a second packet destined to the terminal and received by the second gateway from the second wide area network, the function block comprising a plurality of function blocks between the first gateway and the second gateway, each of the plurality of function blocks corresponding to one of a plurality of terminals accessing the data center via the VPN established between the terminal and the first gateway through the wireless LAN and the first wide area network.

18. A terminal adapted to connect with a data center of a cloud operator, the data center providing a communication service to a terminal via a first wide area network to which the data center connects and a wireless LAN (Local Area Network) to which the terminal connects, the terminal, comprising:

an VPN (Virtual Private Network) apparatus that performs connection between the terminal and the data center, using a VPN (Virtual Private Network) through the wireless LAN and the first wide area network, the terminal connecting through the VPN, a first gateway provided in the data center and terminating the VPN, to a virtual core network provided in the data center, the virtual core network virtualizing at least a part of the constituent elements of a core network, and a second gateway provided in the data center to a second wide area network (WAN2) to which the data center connects; and a function that receives via the VPN an incoming call or data filtered by a function block corresponding to the terminal of a plurality of function blocks provided between the first gateway and the second gateway in the data center out of one or more incoming calls or data destined to the terminal input to the data center from the second wide area network (WAN2).

* * * * *